(12) United States Patent
Ishii et al.

(10) Patent No.: US 7,322,690 B2
(45) Date of Patent: Jan. 29, 2008

(54) FIXED MATERIAL TRANSPORTATION APPARATUS, LIQUID FIXING APPARATUS HAVING TRANSPORATATION APPARATUS AND SUCKING UNIT OF FIXED MATERIAL IN LIQUID FIXING APPARATUS

(75) Inventors: Takayuki Ishii, Nagano (JP); Yoshitaka Shimada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 8 days.

(21) Appl. No.: 10/798,480

(22) Filed: Mar. 12, 2004

(65) Prior Publication Data
US 2004/0263601 A1  Dec. 30, 2004

Related U.S. Application Data

(63) Continuation-in-part of application No. 10/272,303, filed on Oct. 17, 2002, now abandoned.

(30) Foreign Application Priority Data

| Oct. 17, 2001 | (JP) | ............................ P2001-319516 |
| Oct. 17, 2001 | (JP) | ............................ P2001-319518 |
| Mar. 29, 2002 | (JP) | ............................ P2002-093829 |
| Mar. 29, 2002 | (JP) | ............................ P2002-093841 |
| Mar. 13, 2003 | (JP) | ............................ P2003-067459 |

(51) Int. Cl.
  *B41J 2/01* (2006.01)
  *B65H 5/22* (2006.01)
  *B65H 5/38* (2006.01)

(52) U.S. Cl. ...................... 347/104; 400/656; 400/662; 400/648

(58) Field of Classification Search ................. 271/194
See application file for complete search history.

(56) References Cited

U.S. PATENT DOCUMENTS

| 3,182,998 A | 5/1965 | Peterson |
| 5,291,227 A | 3/1994 | Suzuki |

(Continued)

FOREIGN PATENT DOCUMENTS

EP  0 992 347 A2  4/2000

(Continued)

OTHER PUBLICATIONS

Machine translation of JP 07009712 to Kanemura from Japanese Patent Office website.*

*Primary Examiner*—Daniel J. Colilla
(74) *Attorney, Agent, or Firm*—Sughrue Mion, PLLC

(57) ABSTRACT

There are provided a sucking unit having a recording medium transportation surface including a plurality of sucking holes, a decompression chamber communicating with the sucking holes and a sucking device for sucking air in the decompression chamber, and a delivering device for sucking a recording medium supplied onto the recording medium transportation surface of the sucking unit onto the recording medium transportation surface through the sucking hole by the sucking device, and delivering the recording medium from an upstream side of the sucking unit to a downstream side thereof. Each sucking hole of the sucking unit is formed by a through hole section communicating with the decompression chamber and a sucking chamber having a larger area of a sucking surface opposed to the recording medium than a sectional area of the through hole section.

24 Claims, 26 Drawing Sheets

U.S. PATENT DOCUMENTS

| | | | |
|---|---|---|---|
| 6,179,285 B1 * | 1/2001 | Teumer et al. | 271/194 |
| 6,196,672 B1 * | 3/2001 | Ito et al. | 347/88 |
| 6,270,215 B1 | 8/2001 | Miyasaka et al. | |
| 6,315,404 B1 * | 11/2001 | Wotton et al. | 347/102 |
| 6,357,869 B1 | 3/2002 | Rasmussen et al. | |
| 6,409,332 B1 | 6/2002 | Yraceburu et al. | |
| 6,454,478 B2 | 9/2002 | Wotton et al. | |
| 2001/0028380 A1 | 10/2001 | Wotton et al. | |
| 2002/0015610 A1 | 2/2002 | Beehler et al. | |

FOREIGN PATENT DOCUMENTS

| | | |
|---|---|---|
| EP | 1 008 454 A1 | 6/2000 |
| JP | 3-000270 | 1/1991 |
| JP | 553462 | 3/1993 |
| JP | H05-105260 A | 4/1993 |
| JP | H06-143705 A | 5/1994 |
| JP | 7-17087 | 1/1995 |
| JP | 07009712 A * | 1/1995 |
| JP | 8-156351 | 6/1996 |
| JP | 08156351 A * | 6/1996 |
| JP | 09220837 A * | 8/1997 |
| JP | 10-268676 | 10/1998 |
| JP | 63-303781 | 12/1998 |
| JP | 11301880 | 11/1999 |
| JP | 2000006387 A | 1/2000 |
| JP | 2000-191175 A | 7/2000 |
| JP | 2000-238353 | 9/2000 |
| JP | 2000351203 A | 12/2000 |
| JP | 2001-213013 | 8/2001 |
| JP | 2001-347691 | 12/2001 |
| JP | 2002-127516 | 5/2002 |
| WO | WO 00/34158 | 6/2000 |

* cited by examiner

RELATED ART

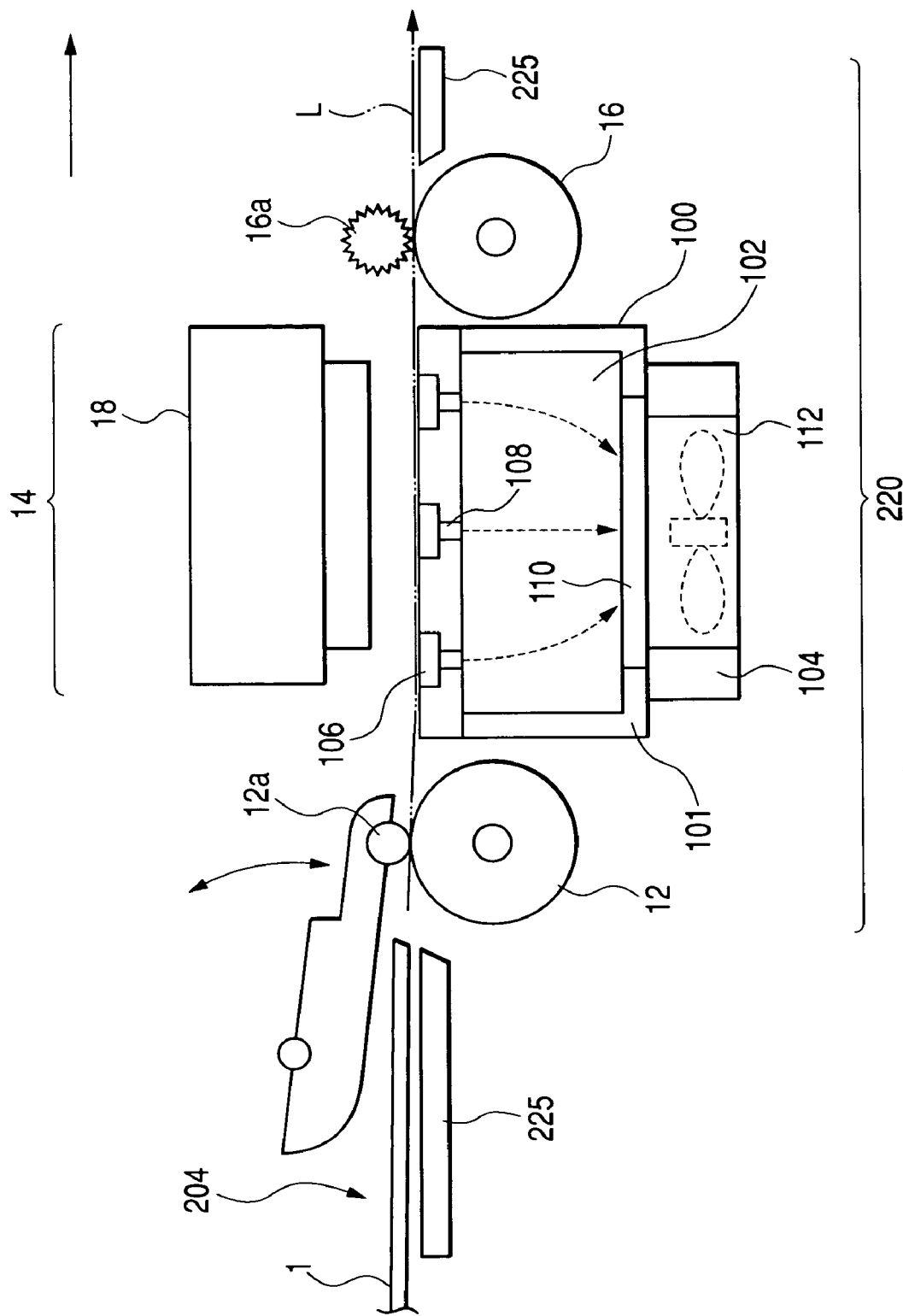

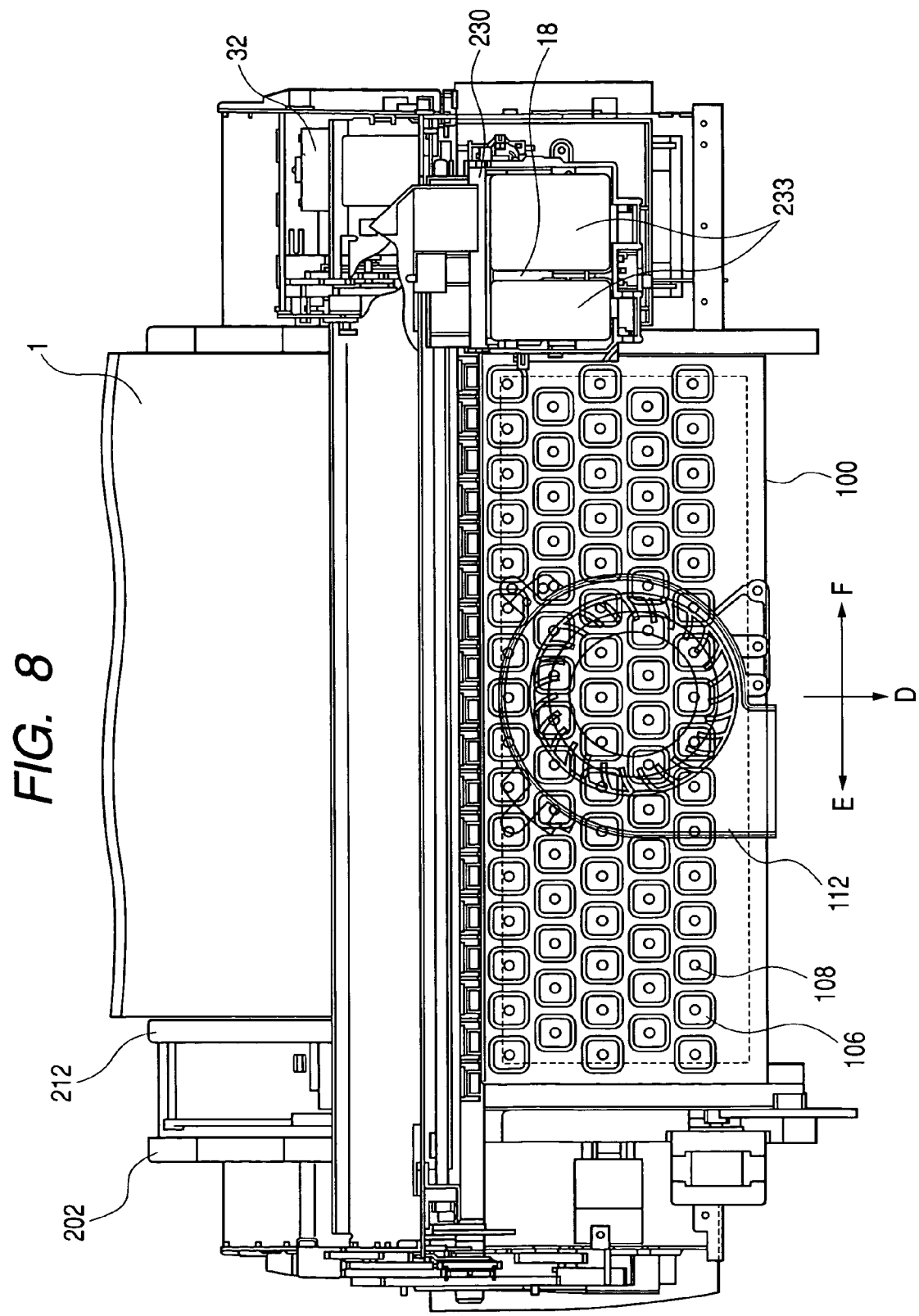

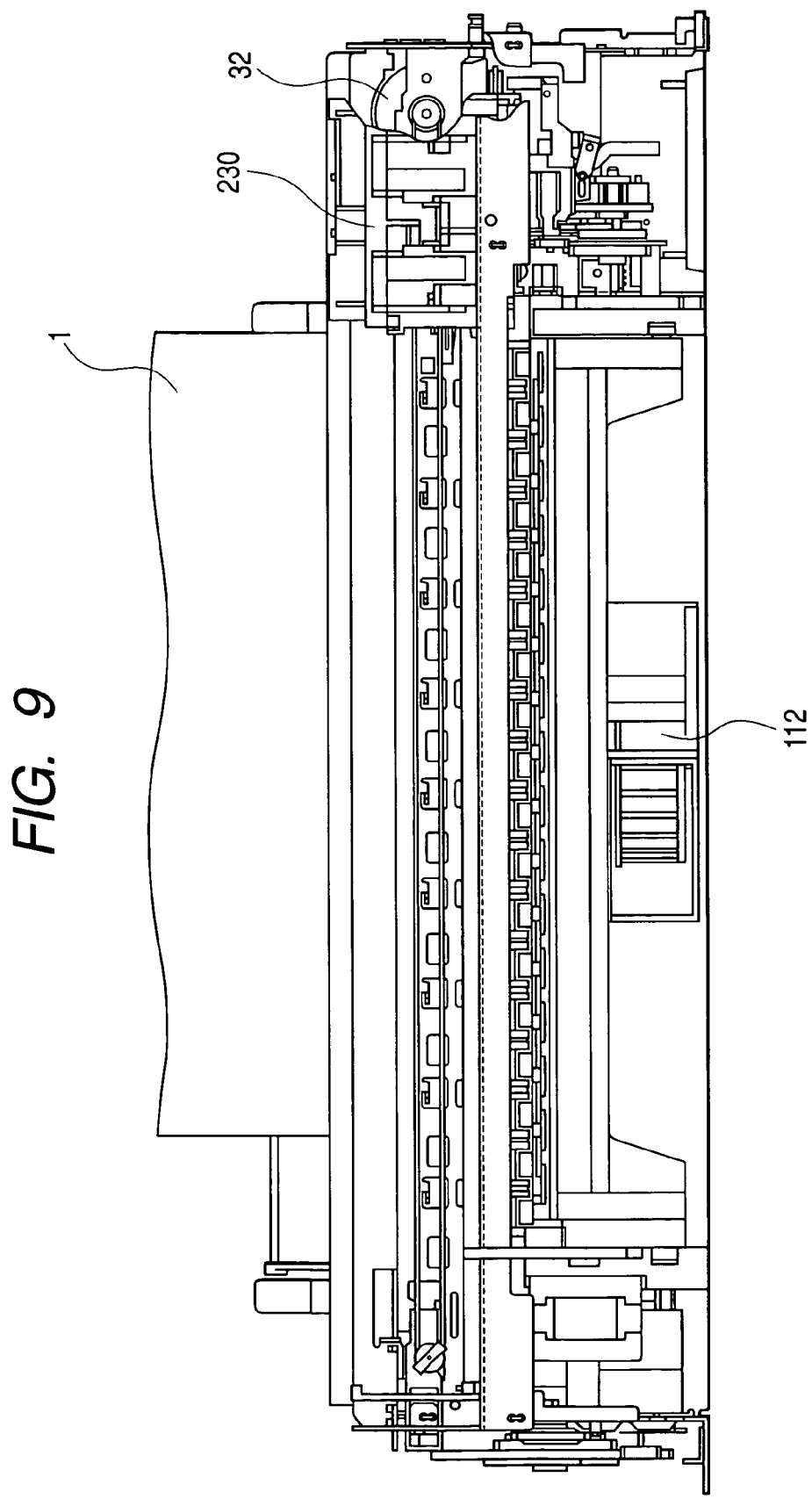

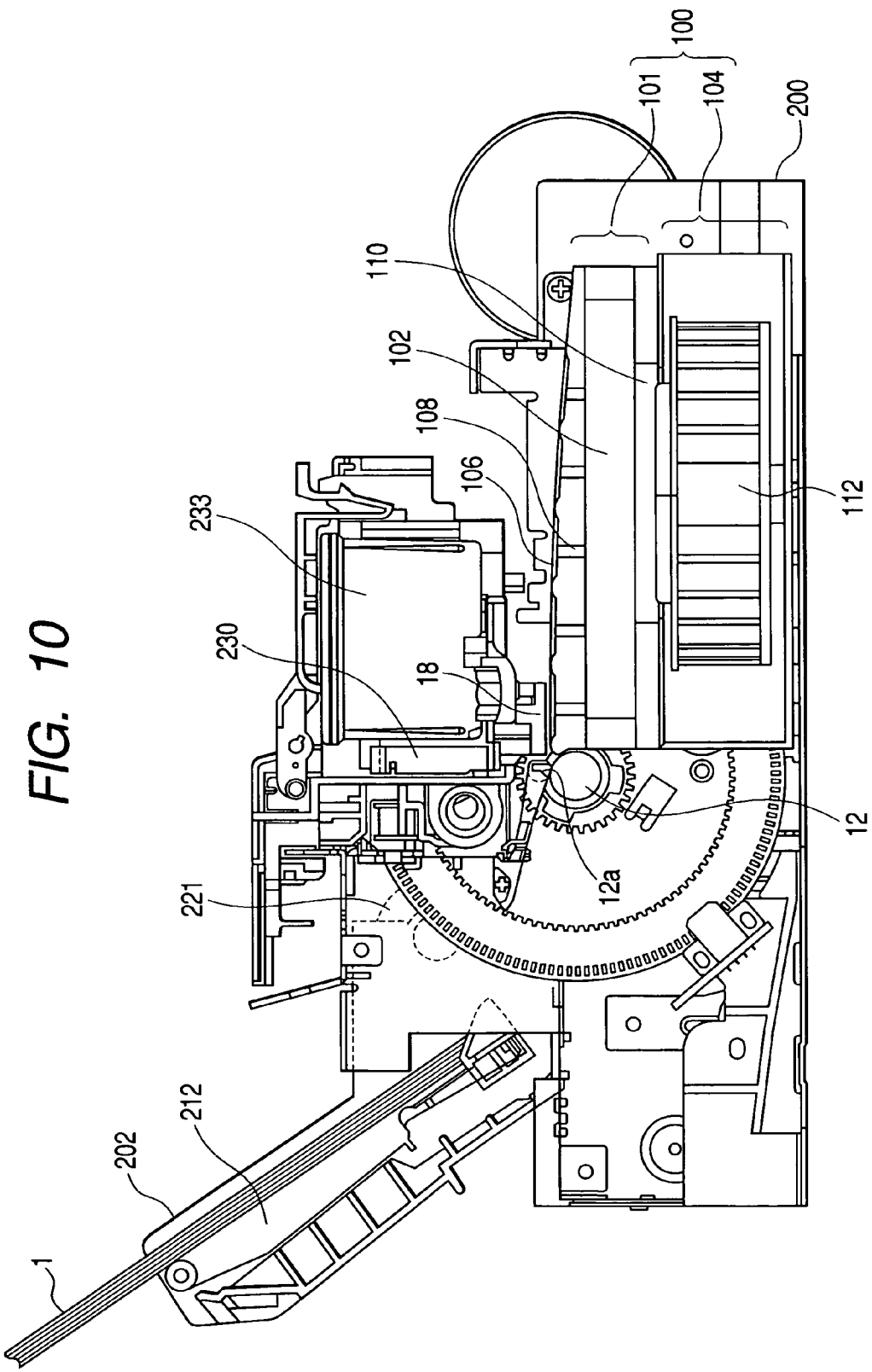

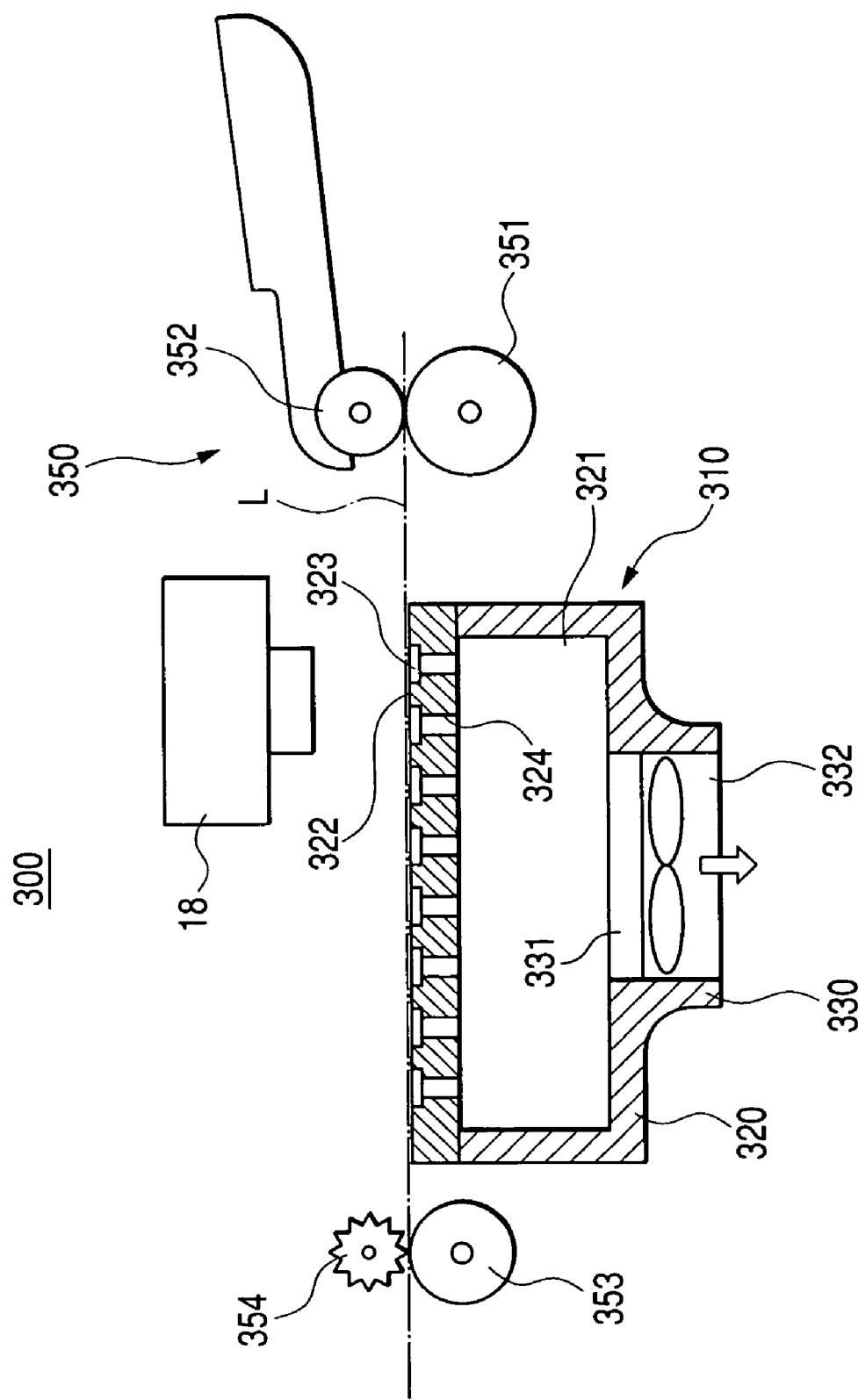

FIG. 17
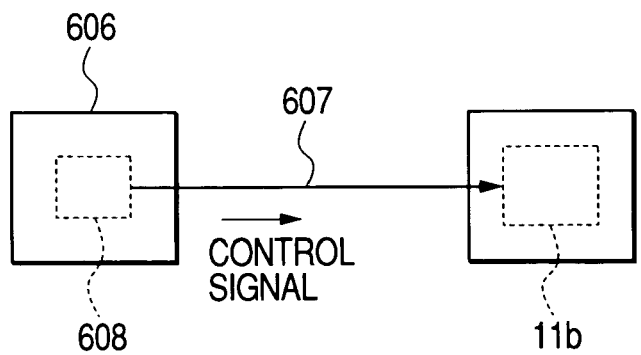
FIG. 18
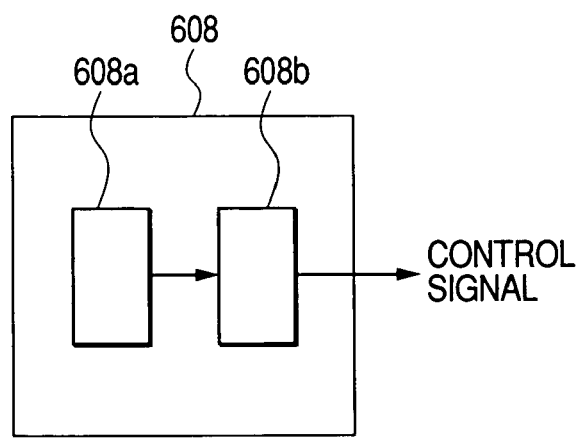
FIG. 19
| RECORDING MEDIUM TYPE | SUCKING FORCE SETTING |
|---|---|
| PLAIN PAPER | LARGE |
| SPECIAL PAPER | SMALL |

FIXED MATERIAL TRANSPORTATION APPARATUS, LIQUID FIXING APPARATUS HAVING TRANSPORATATION APPARATUS AND SUCKING UNIT OF FIXED MATERIAL IN LIQUID FIXING APPARATUS

The present application is a continuation in part application of U.S. patent application Ser. No. 10/272,303 filed on Oct. 17, 2002 now abandoned, which is incorporated herein by reference.

BACKGROUND OF THE INVENTION

The present invention relates to a fixed material (i.e., medium) transportation apparatus, a liquid fixing apparatus having the transportation apparatus, and a sucking unit of a fixed material in the liquid fixing apparatus, and more particularly to a technique for sucking and holding a fixed material in the liquid fixing section of the liquid fixing apparatus.

In an ink jet printer or an ink jet plotter which is one of liquid fixing apparatuses, for example, there has been conventionally employed such a structure that a recording medium to be a fixed material is fed into a recording section by means of a paper feeding roller and is then discharged with pressing by means of a paper discharge roller (a driving roller) and a spur roller to be a driven roller. FIGS. 31A, 31B and 31C are views extracting only a recording section in the ink jet printer and the main part of the transportation apparatus of a recording medium.

More specifically, in such an ink jet printer, a recording medium 1 is fed into a recording section 4 by means of a paper feeding roller 2 (and a driven roller 2a) and is then discharged with pressing by means of a paper discharge roller (a driving roller) 6 and a spur roller 6a to be a driven roller as shown in FIG. 31A. In this case, the pressing force of the spur roller 6a is set such that a damage (a spur mark) is not left on the recording medium 1.

In the ink jet printer having the transportation apparatus of a recording medium shown in FIG. 31A, however, in some cases in which an image having a large number of ink particles discharged, for example, a solid image is to be recorded in the recording medium 1, the recording medium 1 absorbs a large amount of ink and is swollen like a wave toward the recording head 8 side as shown in FIG. 31B, that is, so-called cockling is generated.

When the cockling is generated, a space between the recording medium 1 and the recording head 8 is reduced so that the flight distance of the ink particles is varied, resulting in a recording unevenness or the recording medium 1 comes in contact with the recording head 8, causing a dirt. Also in the transportation apparatus of the recording medium shown in FIG. 31A, if a span between the paper feeding roller 2 and the paper discharge roller 6 is comparatively short, it is also possible to prevent the drawback as much as possible by keeping the cockling within a permissible range.

In the ink jet printer, however, it is necessary to increase the number of nozzles for a nozzle train having each color or to arrange a nozzle train having a plurality of colors in the transportation direction of the recording medium in order to further increase a recording speed in the near future. In these cases, the dimension of a recording head is increased in the transportation direction of the recording medium 1 as shown in FIG. 31C. If the length of the recording medium 1 is increased, the span between the paper feeding roller 2 and the paper discharge roller 6 is also increased. In such a structure that the recording medium is to be delivered and discharged with an interposition between the paper feeding roller 2 (and the driven roller 2a) and the paper discharge roller 6 (and the spur roller 6a to be the driven roller), therefore, the cockling cannot be prevented at all and the permissible range is exceeded. In an ink jet printer having a large head length, it is also possible to suppose a structure in which the recording medium is delivered and discharged with an interposition between two sets of rollers cannot be formed depending on a type.

Moreover, the cockling is comparatively small when a special paper of the ink jet printer is used for the recording medium, and is large when a plain paper is used. For this reason, in the design of the ink jet printer, a paper gap [a space A between the recording medium 1 and the recording head 8 in FIG. 31A] is usually increased in consideration of the floating portion of the plain paper due to the cockling when the same paper is used. If the paper gap is thus large, flight curving is caused over the ink particles discharged from the nozzle of the recording head and a shift of an impact point is increased correspondingly even if the special paper requiring no increase in the paper gap is used. Thus, there is a possibility that an enhancement in printing quality might be prevented.

Furthermore, when the recording medium 1 is floated by the cockling, the floating recording medium 1 is pushed against the spur roller 6a as shown in an arrow B of FIG. 31B. As a result, a spur mark is left on the recording medium 1 by the spur roller 6a as shown in FIG. 32. The spur mark is particularly remarkable over the plain paper having large cockling, causing a deterioration in the printing quality.

On the other hand, in recent years, there have been variously proposed structures in which a hollow-box shaped sucking section is mainly provided on the transportation surface of a recording medium and the recording medium is sucked by a sucking pump through a plurality of sucking (through) holes provided in the sucking section (see Japanese Unexamined Patent Publication Nos. JP-A-63-303781, JP-A-3-270 and JP-A-2001-347710). Some of them have proposed a structure in which a recording medium is sucked into a platen through the sucking holes as a cockling eliminating device.

However, all of them have the structure in which the through hole is simply opened in the hollow-box shaped sucking section to carry out the suction, and it is hard to prevent the cockling over the whole surface of the recording medium in the recording section. Moreover, a portion protruded from the recording section of the recording medium floats and is thus pushed against the spur roller 6a as shown in an arrow B of FIG. 31B. As a result, it is impossible to prevent a spur mark from being left in the recording medium 1.

In the conventional examples described in the publications, furthermore, there has been employed a structure in which the through hole is simply opened in the hollow-box shaped sucking section to carry out the suction. Therefore, if sucking force is too large, precision in transportation (paper feeding) might be deteriorated. For this reason, under present conditions, practical use cannot be realized except for a partial large-sized printer to carry out paper feeding in the direction of a gravity (utilizing a self weight of a paper for the paper feeding).

In recent years, moreover, so-called frameless printing has been carried out in the ink jet printer. There has been a problem in that a so-called waste ink mist is generated in which ink particles supplied from a recording head do not impact on the recording medium but the transportation surface of the recording medium at the outside of the peripheral edge of the recording medium. When such a waste ink mist sticks onto the transportation surface of the recording medium, the back face of the recording medium is made dirty. Therefore, there has conventionally been known a structure in which a mesh screen is provided in this region as described in JP-A-8-169155, for example. In such a structure, however, the ink particles discharged toward the mesh screen partially pass through the mesh screen and partially collide with a frame body constituting the mesh screen, thereby generating a floating mist.

Moreover, in some cases, a harsh sucking sound is generated on various conditions if the sucking holes are provided. Therefore, there has been proposed an ink jet printer comprising a system for coupling a silencer to the discharge port of a sucking pump and eliminating a sound generated by the sucking pump through the silencer (see JP-A-2001-239680).

However, by providing the silencer on the downstream side of the sucking pump in the ink jet printer, a component cost, an assembly cost and an installation space for the silencer are increased. For this reason, there is a problem in that the ink jet printer itself becomes expensive and large-sized.

SUMMARY OF THE INVENTION

The invention has a first object to prevent the cockling of a fixed material (i.e., medium) more effectively in a liquid fixing apparatus, thereby inhibiting a spur mark from being left by a spur roller.

Moreover, the invention has a second object to prevent the cockling as described above, thereby setting a proper paper gap to carry out fixing of high picture quality over a fixed material.

Furthermore, the invention has a third object to absorb a waste liquid mist to prevent the stain of other fixing media in the case of frameless liquid fixing (frameless printing) in a liquid fixing apparatus.

Another object of the invention is to provide a fixed material transportation apparatus capable of reducing the generation of a sucking sound when sucking and transporting a fixed material, and a liquid fixing apparatus comprising the fixed material transportation apparatus.

In order to solve the problems, the inventors have investigated the relationship between the total area of a sucking hole and sucking force in detail in a structure in which a sucking unit having a fixed material transportation surf ace provided with a plurality of sucking holes, a decompression chamber communicating with the sucking holes, and a sucking device for sucking air in the decompression chamber at the discharge side of the fixed material in a liquid fixing apparatus and the fixed material is sucked through the sucking hole provided in the sucking unit, and variously investigated how to prevent the cockling more effectively than that in the conventional example without deteriorating precision in transportation (paper feeding) of the fixed material in any sucking structure in consideration of two points, that is, (1) the utilization rate of a negative pressure which can actually be utilized for the characteristic of a pump when the total area of the sucking hole is increased, and (2) the force for sucking the fixed material cannot be generated when the area of a surface of the sucking hole which is opposed to the fixed material is reduced.

As a result, there was found that if each of the sucking holes provided in the sucking unit is formed by a through hole section communicating with the decompression chamber and a sucking chamber in which the area of a sucking surface opposed to the fixed material is larger than the sectional area of the through hole section, the cockling can be prevented more effectively than that in the conventional example and the fixed material can be delivered and discharged with high precision.

More specifically, a first aspect of the invention is directed to a fixed material transportation apparatus comprising a sucking unit having a fixed material transportation surface provided with a plurality of sucking holes, a decompression chamber communicating with the sucking holes and a sucking device for sucking air in the decompression chamber, and a delivering device for sucking a fixed material supplied onto the fixed material transportation surface of the sucking unit onto the fixed material transportation surface through the sucking hole by the sucking device, and delivering the fixed material from an upstream side of the sucking unit to a downstream side thereof, wherein each of the sucking holes of the sucking unit is formed by a through hole section communicating with the decompression chamber and a sucking chamber having a larger area of a sucking surface opposed to the fixed material than a sectional area of the through hole section.

Moreover, a second aspect of the invention is directed to the fixed material transportation apparatus, wherein the sucking chambers is constituted by concave portions formed onto the fixed material transportation surface and are mutually partitioned by partition walls.

Furthermore, a third aspect of the invention is directed to the fixed material transportation apparatus, wherein the concave portions are partitioned and formed by the partition walls in a main scanning direction and a subscanning direction of the fixed material transportation apparatus.

In addition, a fourth aspect of the invention is directed to the fixed material transportation apparatus, wherein the sucking chambers have sucking surfaces formed by an almost rectangular concave portion.

Moreover, a fifth aspect of the invention is directed to the fixed material transportation apparatus, wherein the sucking chambers have sucking surfaces formed by an almost circular concave portion.

Furthermore, a sixth aspect of the invention is directed to the fixed material transportation apparatus, wherein a width of a top of the partition wall is smaller than a dimension of one side or a diameter of the sucking surface of the sucking chamber.

Moreover, a seventh aspect of the invention is directed to the fixed material transportation apparatus, wherein a top of the partition wall is formed linearly with an area of approximately zero.

In addition, an eighth aspect of the invention is directed to the fixed material transportation apparatus, wherein a top of the partition wall in at least the main scanning direction is formed linearly with an area of approximately zero.

Thus, a liquid fixing apparatus according to a ninth aspect of the invention comprises the fixed material transportation apparatus.

Moreover, a tenth aspect of the invention is directed to a sucking unit comprising a sucking and holding section provided with a plurality of sucking holes, a decompression chamber formed integrally with the sucking and holding section and communicating with the sucking holes, and a sucking device for sucking air in the decompression chamber, a fixed material supplied onto the sucking and holding section being sucked onto the sucking and holding section through the sucking hole by the sucking device, wherein each of the sucking holes is formed by a through hole section communicating with the decompression chamber and a sucking chamber in which an area of a sucking surface opposed to the fixed material is larger than a sectional area of the through hole section.

In order to achieve the object, an eleventh aspect of the invention is directed to a fixed material transportation apparatus for sucking and delivering a fixed material supplied onto the fixed material transportation surface, wherein the fixed material transportation surface is provided with a dimple capable of absorbing an improper state by a wrinkle generated in the fixed material. Even if the cockling extended in the transportation direction of the fixed material after fixing is generated, it is absorbed by a dimple. Therefore, a space between the fixed material and the fixing head can be made uniform and fixing precision can be enhanced, and furthermore, a contamination can be prevented from being caused by the contact of the fixed material with the fixing head.

A twelfth aspect of the invention is directed to the fixed material transportation apparatus according to the eleventh aspect of the invention, wherein the dimple is formed corresponding to an extension rate of the fixed material. Even if the fixed material is extended by the generation of the cockling, consequently, the amount of extension can be absorbed.

A thirteenth aspect of the invention is directed to the fixed material transportation apparatus according to the eleventh or twelfth aspect of the invention, wherein the dimple is formed corresponding to a shape of the wrinkle generated on the fixed material. Consequently, the cockling generated in the fixed material can be absorbed.

A fourteenth aspect of the invention is directed to the fixed material transportation apparatus according to any of the eleventh to thirteenth aspects of the invention, wherein a regulating device for regulating the shape of the wrinkle generated on the fixed material is provided on an upstream side of a transportation from the fixed material transportation surface. A fifteenth aspect of the invention is directed to the fixed material transportation apparatus according to the fourteenth aspect of the invention, wherein the regulating device is provided in a position corresponding to the dimple. Consequently, the shape of the cockling generated in the fixed material can take a predetermined shape. Therefore, the cockling can be absorbed more reliably by the dimple.

A sixteenth aspect of the invention is directed to the fixed material transportation apparatus according to any of the eleventh to fifteenth aspects of the invention, further comprising a sucking unit including a sucking hole having a plurality of sucking holes provided on the fixed material transportation surface, a decompression chamber communicating with the sucking holes and a sucking device for sucking air in the decompression chamber, the sucking hole communicating with the decompression chamber and a sucking chamber having a larger area of a sucking surface opposed to the fixed material than a sectional area of the sucking hole, wherein the sucking chamber functions as the dimple. Even if the cockling is generated in the fixed material, consequently, it can be reliably sucked by the sucking chamber functioning as the dimple, and furthermore, proper sucking force is generated by the sucking chamber. Consequently, it is possible to carry out an adsorption and transportation while maintaining the feeding precision in the fixed material to be high.

In order to achieve the object, a seventeenth aspect of the invention is directed to a liquid fixing apparatus comprising the fixed material transportation apparatus according to any of the eleventh to sixteenth aspects of the invention. Consequently, it is possible to provide a liquid fixing apparatus having the functions and effects described above.

In order to achieve the object, an eighteenth aspect of the invention is directed to a fixed material transportation apparatus for sucking and delivering a fixed material supplied on to a fixed material transportation surface, wherein the fixed material transportation surface is provided with a dimple having a depth changed in a transportation direction of the fixed material. Consequently, the fixed material can be drawn into the dimple. Even if the cockling is extended in the transportation direction of the fixed material, therefore, the space between the fixed material and the fixing head can be made uniform so that fixing precision can be enhanced, and furthermore, the contamination can be prevented from being caused by the contact of the fixed material with the fixing head.

A nineteenth aspect of the invention is directed to the fixed material transportation apparatus according to the eighteenth aspect of the invention, further comprising a sucking unit including a sucking hole having a plurality of sucking holes provided on the fixed material transportation surface, a decompression chamber communicating with the sucking holes and a sucking device for sucking air in the decompression chamber, the sucking hole communicating with the decompression chamber and a sucking chamber having a larger area of a sucking surface opposed to the fixed material than a sectional area of the sucking hole, wherein the sucking chamber functions as the dimple. A twentieth aspect of the invention is directed to the fixed material transportation apparatus according to the nineteenth aspect of the invention, wherein the sucking chamber is formed such that a depth is gradually increased from an edge on an upstream side in a transportation direction of the fixed material to the sucking hole. Consequently, the speed of the air flowing under the fixed material approaching the sucking chamber is increased so that a negative pressure is made higher. Even if the cockling is generated in the fixed material, consequently, the fixed material can be completely sucked into the sucking chamber, and furthermore, proper sucking force is generated by the sucking chamber. Consequently, it is possible to carry out an adsorption and transportation while maintaining the feeding precision in the fixed material to be high.

In order to achieve the objects, a twenty-first aspect of the invention is directed to a liquid fixing apparatus comprising the fixed material transportation apparatus according to any of the eighteenth to twentieth aspects of the invention. Consequently, it is possible to provide a liquid fixing apparatus which produces the functions and effects described above.

In order to solve the problems, in the invention, the sucking unit is provided at the discharge side of the fixed material in the liquid fixing apparatus, and furthermore, a hard porous material is provided in a position corresponding to the edge portion of the fixed material of the fixed material transportation surface in the sucking unit. Consequently, a so-called waste liquid mist to impact on the outside of the peripheral edge of the fixed material for frameless printing is absorbed by the hard porous material.

More specifically, a twenty-second aspect of the invention is directed to a fixed material transportation apparatus comprising a sucking unit for sucking and holding a fixed material and a delivering device for delivering the fixed material from an upstream side of the sucking unit to a downstream side thereof, the sucking unit having a fixed material transportation surface provided with a plurality of sucking holes, a decompression chamber communicating with the sucking holes and a sucking device for sucking air in the decompression chamber, the fixed material supplied onto the fixed material transportation surface of the sucking unit being sucked onto the fixed material transportation surface through the sucking hole by the sucking device during liquid fixing by the delivering device and being delivered from an upstream side to a downstream side, wherein a hard porous material is provided in a position corresponding to a fixed material edge section of the fixed material transportation surface.

According to the structure, the fixed material is supplied onto the fixed material transportation surface of the sucking unit by the delivering device, and is sucked onto the fixed material transportation surface through the sucking hole by the sucking device. The fixed material is fixed by the fixing head in an adsorption state onto the fixed material transportation surface, and furthermore, the fixed material is gradually delivered from the upstream side toward the downstream side by the delivering device. After the liquid fixing is ended, the fixed material is discharged toward the outside.

In this case, even if liquid particles supplied from the fixing head impact as a so-called waste liquid mist on the fixed material transportation surface of the sucking unit at the outside from the peripheral edge of the fixed material in the frameless printing, the waste liquid mist impacts on the hard porous material because the hard porous material is provided in the vicinity of an impact position. Thus, the waste liquid mist does not stay in the surface of the hard porous material but is absorbed in the hard porous material. Accordingly, the fixed material can be prevented from being contaminated. Furthermore, the porous material for absorbing the waste liquid mist is hard. Therefore, even if force is applied to the porous material for some reason, the porous material can be prevented from being deformed, resulting in the flow of the absorbed waste liquid mist.

Moreover, a twenty-third aspect of the invention is directed to the fixed material transportation apparatus according to the twenty-second aspect of the invention, wherein a hard porous material is provided in positions corresponding to widths of various papers of the fixed material. According to the structure, the waste liquid mist on both side edges of the fixed material is absorbed by the hard porous material in the edgeless printing of the fixed material.

Furthermore, a twenty-fourth aspect of the invention is directed to the fixed material transportation apparatus according to the twenty-second or twenty-third aspect of the invention, wherein the hard porous material is provided to; be extended in a lateral direction of the fixed material. According to the structure, the waste liquid mist on the upper and lower edges of the fixed material is absorbed by the hard porous material in the edgeless printing of the fixed material.

Moreover, a twenty-fifth aspect of the invention is directed to the fixed material transportation apparatus according to any of the twenty-second to twenty-fourth aspects of the invention, wherein the hard porous material is removably attached to the fixed material transportation surface. According to the structure, the edgeless printing is repeatedly carried out. Consequently, it is possible to easily exchange the hard porous material absorbing the waste liquid mist in a large amount.

Furthermore, a twenty-sixth aspect of the invention is directed to the fixed material transportation apparatus according to any of the twenty-second to twenty-fifth aspects of the invention, wherein an absorbent is provided on an underside of the hard porous material. According to the structure, the waste liquid mist absorbed in the hard porous material is absorbed by the absorbent to be positioned thereunder. Consequently, the waste liquid mist is absorbed in a large amount into the hard porous material. Consequently, the waste liquid mist can be prevented from soaking from the surface of the hard porous material.

Moreover, a twenty-seventh aspect of the invention is directed to the fixed material transportation apparatus according to any of the twenty-second to twenty-sixth aspects of the invention, wherein a lower part of the hard porous material communicates with a decompression chamber. According to the structure, the air is circulated from the fixed material transportation surface in the hard porous material and/or the absorbent for processing by a negative pressure acting through the decompression chamber. Therefore, the evaporation of water of the waste liquid mist absorbed in the hard porous material and/or the absorbent is promoted. Consequently, it is possible to reduce the porous material and the absorbent.

Furthermore, a twenty-eighth aspect of the invention is directed to a liquid fixing apparatus comprising the fixed material transportation apparatus. According to the liquid fixing apparatus having such a structure, even if the liquid particles supplied from the fixing head impact as a so-called waste liquid mist on the fixed material transportation surface of the sucking unit at the outside from the peripheral edge of the fixed material in edgeless printing, the waste liquid mist impacts onto the hard porous material by the provision of the hard porous material in the vicinity of the impact position. Consequently, the waste liquid mist is absorbed in the hard porous material without staying in the surface of the hard porous material. Accordingly, the fixed material can be prevented from being contaminated by the waste liquid mist remaining in the fixed material transportation surface of the sucking unit.

The invention also provides a fixed material transportation apparatus for sucking and transporting a fixed material supplied onto a fixed material transportation surface, wherein a chamfer is provided in at least one of an air inlet portion and an air outlet portion in a sucking hole formed on the fixed material transportation surface. By forming the chamfer, thus, it is possible to almost prevent the separation of the vortex of an air flow which is generated in the air inlet portion or the air outlet portion in the sucking hole. Consequently, it is possible to reduce the generation of a sucking sound which is caused by a periodic fluctuation in the separating vortex.

The chamfered surface of the air inlet portion of the sucking hole is a rounded surface. Such a rounded surface can generate a non-separating vortex in the air inlet portion of the sucking hole. The radius of the rounded surface ranges from 0.2 mm to 1 mm. By forming the rounded surface within such a range, it is possible to reduce the generation of a sucking sound and to generate a negative pressure at which a sufficient sucking force can be obtained.

The chamfered surface of the air outlet portion of the sucking hole is a taper surface. Such a taper surface can generate a non-separating vortex in the air outlet portion of the sucking hole. The taper of the taper surface is characterized in that an opening angle ranges from 60 degrees to 90 degrees and an axial length ranges from 1 mm to 2 mm. By forming the taper surface within such a range, it is possible to reduce the generation of a sucking sound and to generate a negative pressure at which a sufficient sucking force can be obtained.

BRIEF DESCRIPTION OF THE DRAWINGS

FIG. 1A is a plan view and FIG. 1B is a sectional view thereof;

FIG. 7 is a view showing a recording medium transportation apparatus to be the main part of the ink jet printer in FIG. 6;

FIG. 8 is a plan view showing an embodiment of the sucking unit of the recording medium transportation apparatus in FIG. 7;

FIG. 9 is a front view showing the embodiment of the sucking unit of the recording medium transportation apparatus in FIG. 7;

FIG. 10 is a side view showing the embodiment of the sucking unit of the recording medium transportation apparatus in FIG. 7;

FIG. 11 is a side view showing a recording medium transportation apparatus according to a third embodiment of the invention;

FIG. 17 is a schematic view showing the operation of a printer driver in the ink jet printer of FIG. 15;

FIG. 18 is a view for explaining the sucking force setting of a sucking unit by the printer driver of FIG. 17;

FIG. 19 is a table to be utilized for the sucking force setting of FIG. 18;

DETAILED DESCRIPTION OF THE PREFERRED EMBODIMENTS

An embodiment of the invention will be described below in detail with reference to the drawings.

Figure 1A:
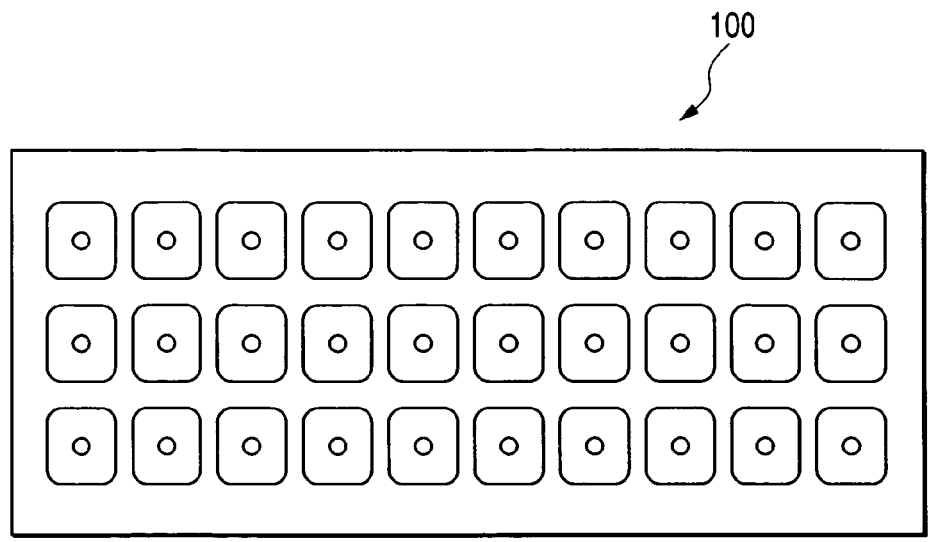
FIGS. 1A and 1B are views showing the main structure of a sucking unit according to a first embodiment of the invention.
Figure 1B:
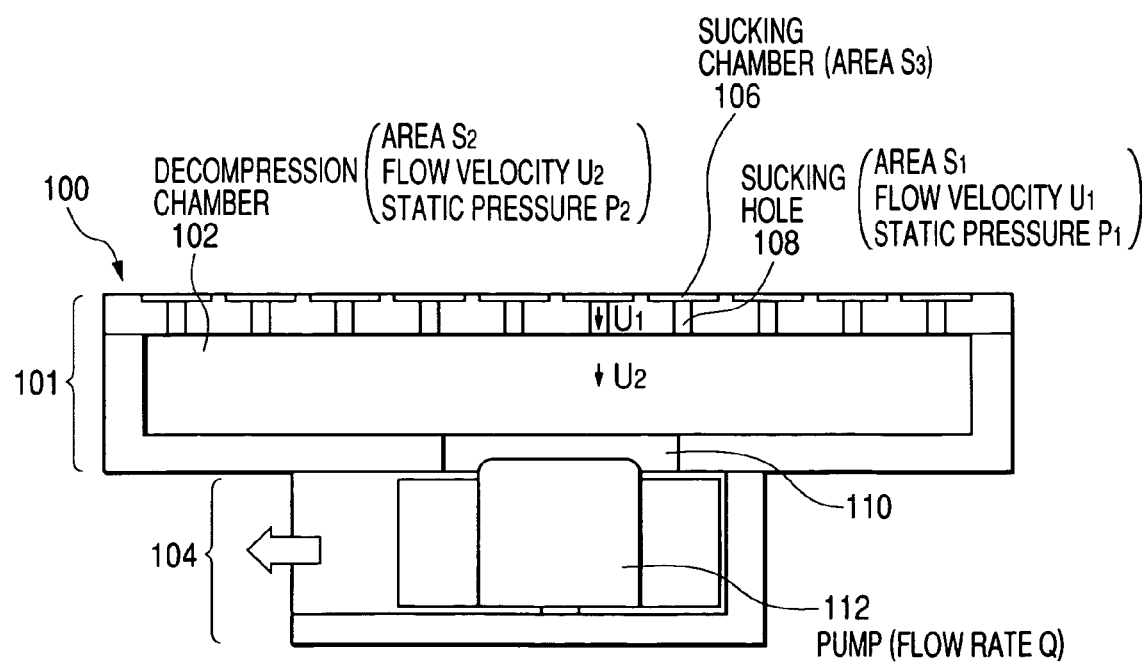

FIGS. 1A and 1B show views showing the main structure of a sucking unit according to a first embodiment of the invention, FIG. 1A is a plan view and FIG. 1B is a sectional view. As shown in FIG. 1B, a sucking unit 100 according to the embodiment is formed to take the shape of a hollow box having a two-stage upper and lower structure comprising a sucking section 101 in an upper stage and a sucking force generating section 104 in a lower stage.

As shown in FIGS. 1A and 1B, the sucking section 101 has a decompression chamber 102 (an area $S_2$) formed on an inner part, a plurality of sucking chambers 106 (an area $S_3$) formed to be almost rectangular concave portions on the transportation surface of a recording medium and a plurality of sucking holes 108 (an area $S_1$) extended in a vertical direction in order to communicate with the decompression chamber 102 respectively. The sucking force generating section 104 communicates with the decompression chamber 102 of the sucking section 101 through a communicating hole 110 and includes a pump 112 (a flow rate Q) having a centrifugal fan therein.

Description will be given to the basic principle of the invention to be the premise of the embodiment. As shown in FIG. 1B, a sectional area in a vertical direction to a flow line is represented by $S_1$, a flow velocity is represented by $U_1$ and a static pressure is represented by $P_1$ in the sucking hole 108 portion, and a sectional area in a vertical direction to a flow line is represented by $S_2$, a flow velocity is represented by $U_2$ and a static pressure is represented by $P_2$ in the decompression chamber 102 portion, an air density is represented by $\rho$, and an external air pressure (atmospheric pressure) of the sucking unit 100 is represented by $P_0$.

By a flow having the flow rate Q of the pump 112, a flow is caused in a path of the outside→the sucking hole 108→the decompression chamber 102. At this time, changes in a dynamic pressure in the outside→the sucking hole 108 and the sucking hole 108→the decompression chamber 102 are substituted for a static pressure at a certain rate and are added to static pressures on the outside and the sucking hole 108 portion, respectively. More specifically, in the outside→the sucking hole 108, the dynamic pressure of the outside is set to be 0 and the dynamic pressure in the sucking hoe 108 is set to be $\rho U_1^2/2$. The change in the dynamic pressure is set to be $0-\rho U_1^2/2$, and the static pressure $P_1$ in the sucking hole 108 to be the sum of the static pressure of the outside and a certain rate of the change in the dynamic pressure is represented as follows.

$$P_1 = P_0 + (1+\zeta_1)(0 - \rho U_1^2/2) \quad (1)$$
$$= P_0 - (1+\zeta_1)\rho U_1^2/2$$

In the sucking hole 108→the decompression chamber 102, similarly, the dynamic pressure of the sucking hole 108 is set to be $\rho U_1^2/2$ and the dynamic pressure of the decompression chamber 102 is set to be $\rho U_2^2/2$. A change in the dynamic pressure is represented by $\rho U_1^2/2 - \rho U_2^2/2$. Accordingly, the static pressure $P_2$ in the decompression chamber 102 to be the sum of a static pressure in the sucking hole 108 and a rate of a change in the dynamic pressure is represented as follows.

$$P_2 = P_0 - (1+\zeta_1)\rho U_1^2/2 + (1-\zeta_2)(\rho U_1^2/2 - \rho U_2^2/2) \quad (2)$$

$\zeta_1$ represents a loss coefficient based on a contraction flow in an inlet section and is estimated at 0 to 0.15. $\zeta_2$ represents a loss coefficient based on a rapid enlargement and is close to 1 if a ratio of $S_2$ to $S_1$ is set to be high. From the foregoing, $\zeta_1=0$ and $\zeta_2=1$ are set.

The above-mentioned (1) and (2) are collectively represented by the coefficient values in the following manner.

$$P_1 = P_0 - \rho U_1^2/2 \quad (3)$$

$$P_2 = P_0 - \rho U_1^2/2 \quad (4)$$

More specifically, the pressure $P_1$ in the sucking hole 108 and the pressure $P_2$ in the decompression chamber 102 are reduced by $\rho U_1^2/2$ equally to each other as compared with an external pressure $P_0$.

A reduction from the atmospheric pressure $P_0$ is represented by $\Delta P$.

$$\Delta P = P_0 - P_1 = P_0 - P_2 \quad (5)$$

Moreover, the flow velocity $U_1$ is a value obtained by dividing the flow rate Q by the total area $\Sigma S_1$ of the sucking hole 108.

$$U_1 = Q/\Sigma S_1 \quad (6)$$

From the foregoing, the equations (3) and (4) are represented as follows.

$$\Delta P = \rho(Q/\Sigma S_1)^2/2 \quad (7)$$

Moreover, when a sectional area in a vertical direction to a flow line in the sucking chamber 106 portion is represented by $S_3$, the sucking force of the recording medium for each sucking chamber is represented by $\Delta P \cdot S_3$ and whole sucking force is represented by $\Delta P \cdot \Sigma S_3$.

Figure 2:
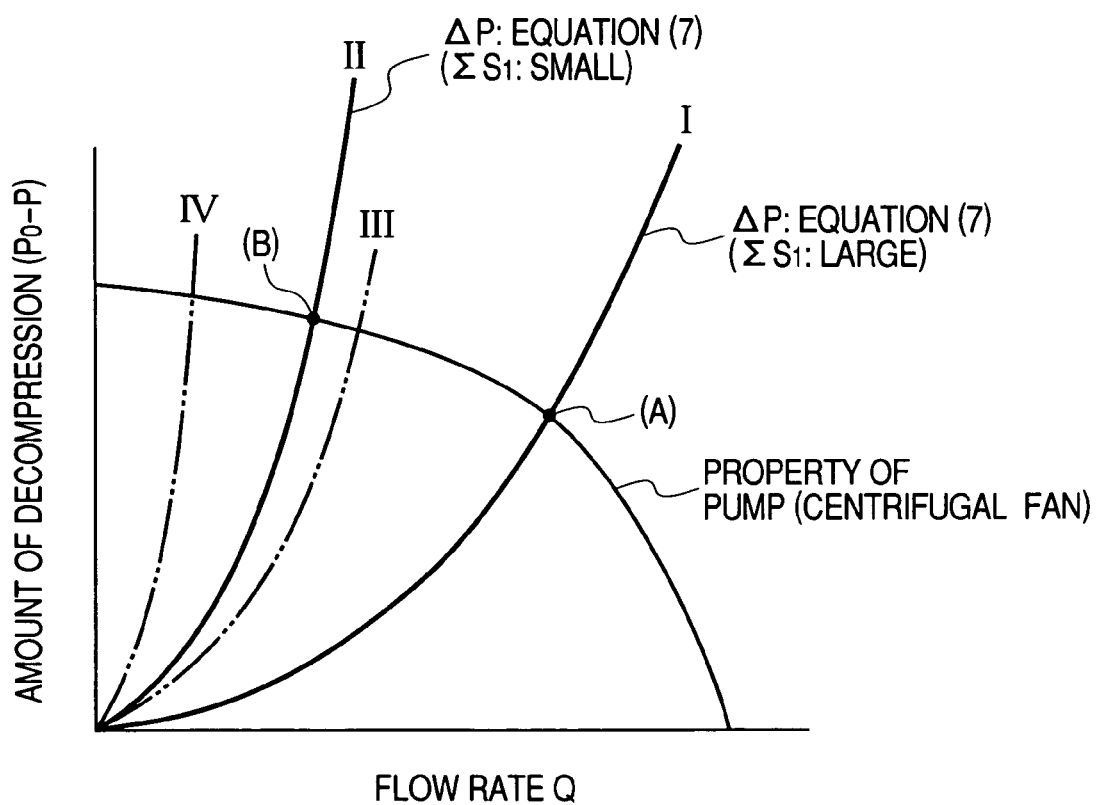
FIG. 2 is a graph showing a pump (centrifugal fan) characteristic, the pump (centrifugal fan) characteristic indicating a change in the utilization rate of an amount ($P_0-P$) of generated decompression in the cases in which a total area $\Sigma S_1$ of a plurality of sucking holes is large and small.

FIG. 2 shows, in a graph, a typical pump (centrifugal fan) characteristic and a characteristic in the equation (7), illustrating a change in the utilization rate of an amount $(P_0-P)$ of generated decompression in the cases in which the total area $\Sigma S_1$ of a plurality of sucking holes 108 is large and small in the pump characteristic. In the graph of FIG. 2, an axis of ordinate indicates the amount $(P_0-P)$ of decompression from an atmospheric pressure and an axis of abscissa indicates the flow rate Q of the pump 112.

In FIG. 2, there are obtained intersections (A) and (B) of a curve representing each of $\Delta P$ based on the equation (7) of the case I in which the total area $\Sigma S_1$ of the sucking hole 108 is large and the case II in which it is small, and a curve representing the pump (centrifugal fan) characteristic. Consequently, the amount $(P_0-P)$ of decompression to be utilized can be obtained. Thus, it is apparent that the utilization rate of the amount of the generated decompression is more increased in the case in which the total area $\Sigma S_1$ of the sucking holes 108 is smaller.

Curves III and IV in FIG. 2 indicate curves representing $\Delta P$ based on the equation (7) in the case in which the sucking hole 108 is covered with the recording medium and the total area $\Sigma S_1$ of the sucking holes 108 is decreased (the curve III corresponds to the curve I and the curve IV corresponds to the curve II). From the drawing, it is apparent that a change in the amount of the generated decompression is smaller in the case in which the total area $\Sigma S_1$ during the opening of the sucking holes 108 is smaller. This indicates that a change in the amount of the generated decompression is smaller for recording media having various widths in the case in which the total area $\Sigma S_1$ of the sucking holes 108 is smaller, and it is possible to effectively prevent cockling for the recording media having various sizes and to obtain a stable recording medium transportation.

On the other hand, as described above, the sucking force of the recording medium for each sucking chamber 106 is represented by $\Delta P \cdot S_3$ and the whole sucking force is represented by $\Delta P \cdot \Sigma S_3$. After all, the conclusion is that it is preferable that the total area $S_1$ of the sucking holes 108 should be smaller and the area $S_3$ of the sucking chamber 106 formed on the transportation surface of the recording medium should be larger.

More specifically, in the case in which a sucking hole (a through hole) in a conventional sucking structure described in JP-A-63-303781 and JP-A-3-270 was supposed, there were noted two points of (1) the utilization rate of a negative pressure which can be utilized for the actual characteristic of a pump is reduced when the total area of the sucking holes is increased and (2) the force for sucking a recording medium cannot be generated when the area of the surface of the sucking hole which is opposed to the recording medium is reduced. Various investigations have repetitively been carried out for any sucking structure in which the cockling can be prevented more effectively than in the conventional example without deteriorating the transportation (paper feeding) precision of the recording medium.

As a result, for a basic structure, a portion corresponding to a sucking hole in the conventional sucking structure is formed by the sucking chamber 106 (the area $S_3$) and the sucking hole 108 (the area $S_1$) and the sucking hole 108 (the area $S_1$) is formed by a through hole having a small diameter. Consequently, the utilization rate of a negative pressure which can be utilized for the characteristic of the pump is enhanced, and furthermore, the sucking chamber 106 forming the surface opposed to the recording medium is provided to be an almost rectangular concave portion having a larger area. Consequently, large sucking force can be generated for the recording medium [see FIGS. 1A and 1B]. It was confirmed that the planar shape of the sucking chamber 106 also produces the effect in a circular shape, an elliptic shape and a rhombic shape in addition to the rectangular shape.

Next, a second embodiment of the invention will be described with reference to FIGS. 3 to 5. The basic structure of a sucking unit according to the second embodiment is almost the same as that in the first embodiment. Therefore, the same portions have the same reference numerals and detailed description thereof will be omitted.

Figure 5:
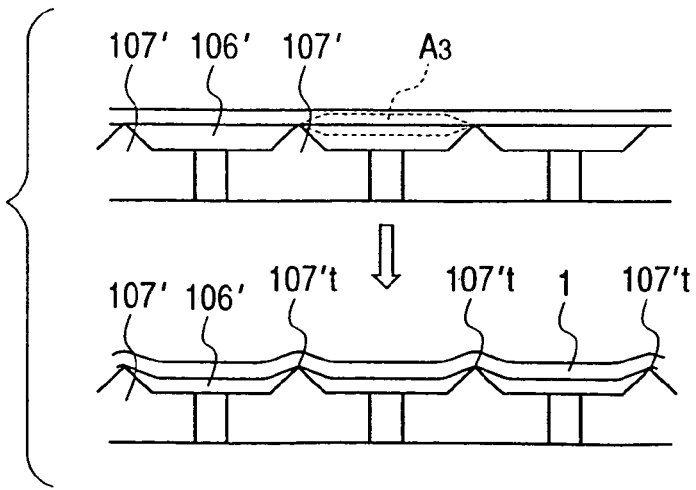
FIG. 5 is a view showing the function and effect of a sucking unit according to a second embodiment.

More specifically, in the embodiment, a plurality of sucking chambers 106' have concave portions formed on a recording medium transportation surface which are mutually partitioned by partition walls 107' as shown in FIG. 5. Moreover, the partition walls 107' are formed in a main scanning direction and a subscanning direction, respectively. The sucking chambers 106' have sucking surfaces formed by almost rectangular concave portions, respectively. The sucking chambers 106' may have the sucking surfaces formed by almost circular concave portions, respectively. In the sucking unit according to the second embodiment, a top 107't of the partition wall 107' is formed linearly to have an area of approximately zero.

The function and effect of the sucking unit according to the second embodiment will be described as compared with the first embodiment and the conventional example. FIG. 3 is a view showing the function and effect of the sucking unit according to the conventional example as a comparative example, FIG. 4 is a view showing the function and effect of the sucking unit according to the first embodiment as a comparative example, and FIG. 5 is a view showing the function and effect of the sucking unit according to the second embodiment.

First of all, description will be given to the function and effect of the sucking unit according to the conventional example. As shown in FIG. 3 (upper part), sucking force is represented by $\Delta P \cdot A_1 (\Delta P=P_0-P)$ and $\Delta P=P_0-P$ is the same as that in the sucking unit according to the first and second embodiments. Since an area (a sectional area) $A_1$ of a surface of the sucking hole 31 which is opposed to a recording medium 1 is the smallest, the sucking force is small.

Figure 3:
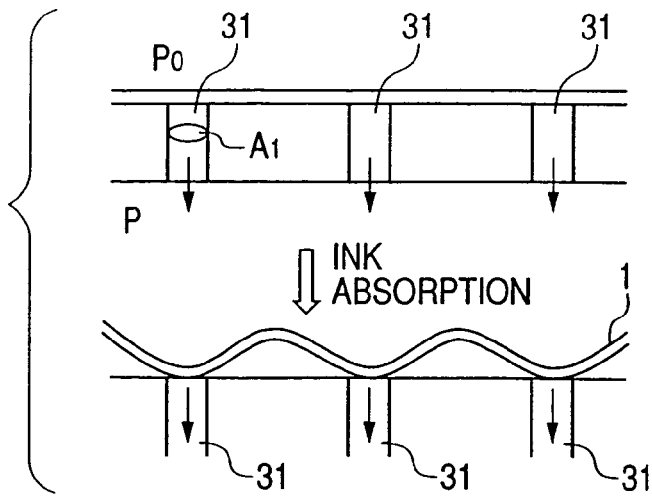
FIG. 3 is a view showing the function and effect of a sucking unit according to a conventional example as a comparative example.

When the recording medium 1 absorbs a large amount of ink such as a solid image, the upper part of the sucking hole 31 is sucked and force for downward pressing does not act on a portion between the sucking holes 31 and 31 as shown in FIG. 3 (lower part). Therefore, the recording medium 1 floats greatly. Referring to the drawings disclosed in the JP-A-63-303781 and the JP-A-3-270, it is apparent that a space between mutual sucking holes is very enlarged. Therefore, the cockling is to be set within a wide range and to be enlarged and a floating height is also increased.

Next, the function and effect of the sucking unit according to the first embodiment will be described. As shown in FIG. 4 (upper part), the sucking force is represented by $\Delta P \cdot A_2$ ($\Delta P=P_0-P$) and $\Delta P=P_0-P$ is the same as that in the sucking unit according to the conventional example and the second embodiment. Since an area (a sectional area) $A_2$ of a surface of the sucking chamber 106 which is opposed to the recording medium 1 is larger than that in the conventional example, the sucking force is more increased.

Figure 4:
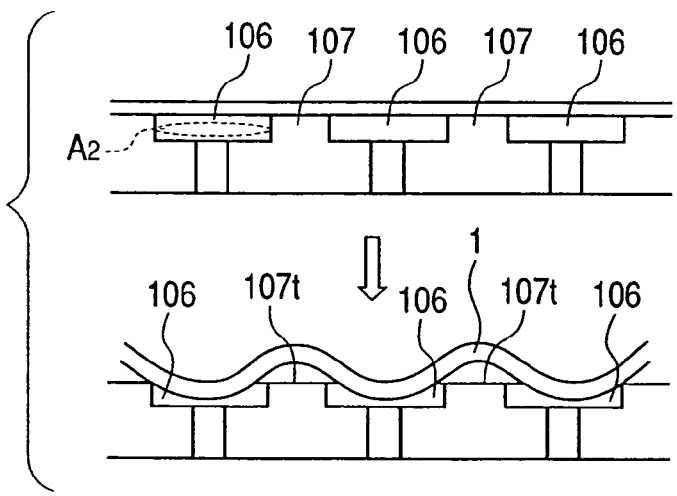
FIG. 4 is a view showing the function and effect of a sucking unit according to a first embodiment as a comparative example.

Even if the recording medium 1 absorbs a large amount of ink for a solid image, the upper part of the sucking chamber 106 is sucked (concaved) and force for downward pressing does not act on a portion between the sucking chambers 106 and 106 (the top 107t of the partition wall 107) as shown in FIG. 4 (lower part). Therefore, the recording medium 1 floats. If the portion between the suction chambers 106 and 106 (the top 107t of the partition wall 107) is comparatively small, it is sufficient that the cockling is set in a small range and is small. In this sense, it is desirable that the width of the top 107t of the partition wall 107 for the mutual sucking chambers 106 should be as much as small. At least the width of the top 107t of the partition wall 107 is to be formed to be smaller than the dimension of one side or the diameter of the sucking surface of the sucking chamber 106.

Subsequently, the function and effect of the sucking unit according to the second embodiment will be described. As shown in FIG. 5 (upper part), sucking force is represented by $\Delta P \cdot A_3 (\Delta P=P-P0)$ and $\Delta P=P-P0$ is the same as that of the sucking units according to the conventional example and the first embodiment. Since an area (a sectional area) $A_3$ of the surface of the sucking chamber 106' which is opposed to the recording medium 1 is larger than the areas of the conventional example and the first embodiment, the sucking force is maximized.

Even if the recording medium 1 absorbs a large amount of ink for a solid image, the upper part of the sucking chamber 106' is sucked (concaved) and a portion between sucking chambers 106 and 106' (a top 107't of a partition wall 107') is formed linearly with an area of approximately zero as shown in FIG. 5 (lower part). Therefore, the recording medium 1 does not float.

Usually, a paper to be the recording medium has such a direction that the fibrous property of the paper is extended, and the cockling is generated in this direction with difficulty but is apt to be generated in an orthogonal direction to this direction. Moreover, the cockling has a peculiar cycle based on the relationship with the fibrous property of the paper thus extended. For example, in an A4 plain paper, the fibrous property of the paper is extended in a longitudinal direction (a paper feeding direction or a subscanning direction when the paper is fed to the printer). Accordingly, the cockling is generated in the subscanning direction with difficulty but is apt to be generated in the main scanning direction.

In the second embodiment, therefore, the partition wall 107' is formed in the main scanning direction and the subscanning direction respectively, and the top 107' of the partition wall 107' is formed linearly with an area of approximately zero. It is preferable that the top 107't of the partition wall 107' in at least the main scanning direction should be formed linearly with an area of approximately zero.

As described above, in the second embodiment, the plain paper is used for the recording medium 1. Even if the plain paper absorbs a large number of ink for a solid image, it rarely floats as shown in FIG. 5 (lower part). Therefore, it is possible to preset a paper gap to be smaller than that in the conventional example. Accordingly, it is possible to enhance recording picture quality when the plain paper is used to carry out recording.

Figure 6:
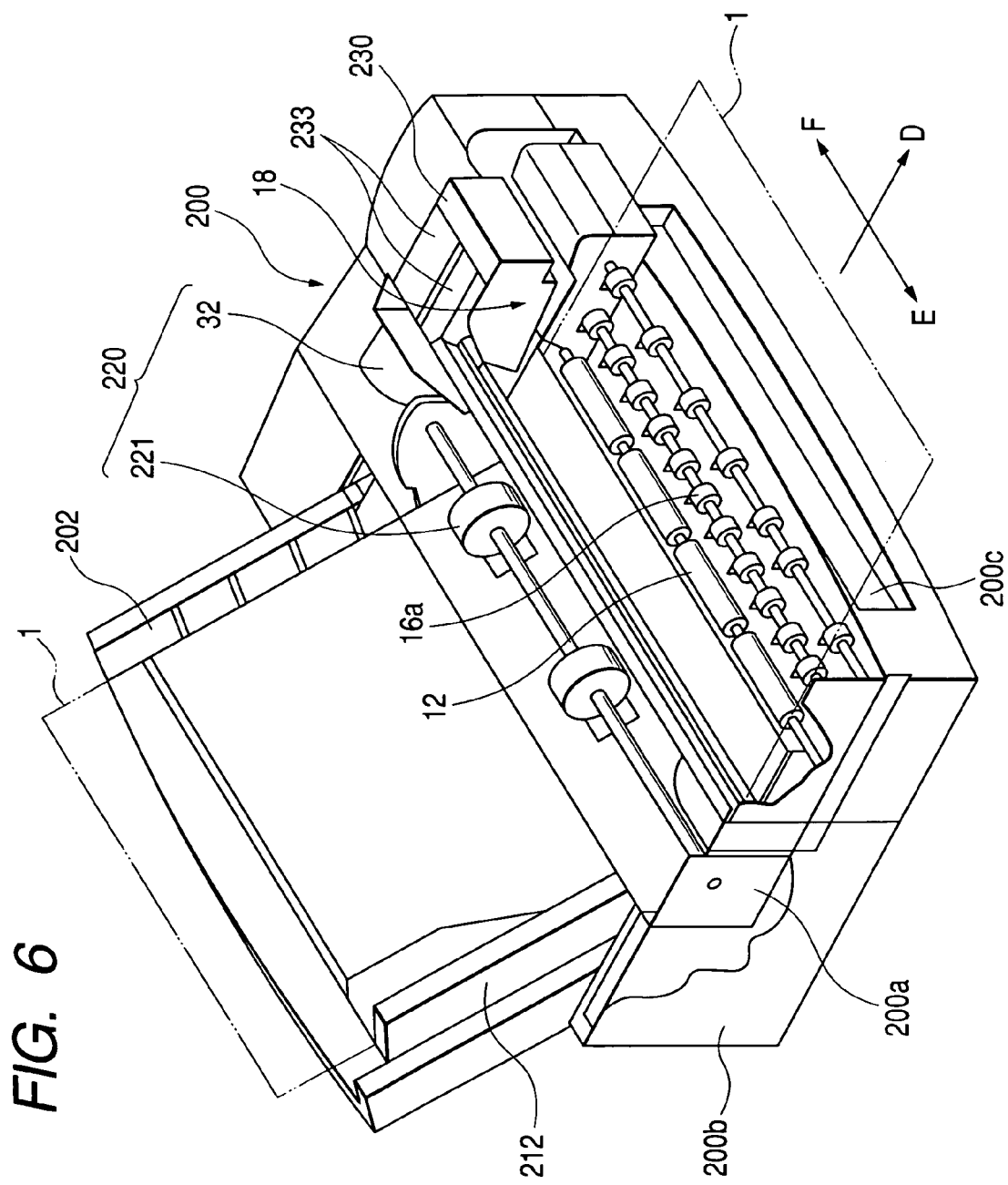
FIG. 6 is a view showing an ink jet printer to be a recording device to which the invention is applied.

FIG. 6 shows an ink jet printer to be a recording device to which the invention is applied, FIG. 7 is a recording medium transportation apparatus to be a main part and FIGS. 8 to 10 show an embodiment of a sucking unit. FIG. 8 is a plan view showing an embodiment of the sucking unit, FIG. 9 is a front view, and FIG. 10 is a side view.

As shown in FIG. 6, the ink jet printer basically has such a structure that a recording medium 1 accommodated in a paper tray 212 of an automatic paper feeding (ASF) unit 202 attached obliquely to a printer body 200 is fed into a recording head 18 and a recording section 14 including a sucking unit 100 positioned under the recording head 18 and the recording medium 1 is discharged from the printer body 200 after recording by a recording medium transportation apparatus 220 for delivering the recording medium 1 in a transportation direction D during the recording.

A manual paper feeding port 204 (see FIG. 7) which is not shown in FIG. 6 is formed on the back surface side of the printer body 200, and the recording medium 1 fed manually from the manual paper feeding port 204 and supplied is also sent into the recording section 14 by the recording medium transportation apparatus 220 during the recording, and furthermore, the recording medium 1 is discharged from the printer body 200 after the recording. In FIG. 6, the printer body 200 includes a support frame 200a, an outer cover 200b and a discharge port 200c for the recording medium 1. For the recording medium 1, it is possible to use a special paper for an ink jet printer, a plain paper, an OHP film, a tracing paper and a postcard.

The recording medium transportation apparatus 220 includes a sucking unit 100 for sucking and holding the recording medium 1 during recording, and a recording medium transportation unit for delivering the recording medium 1 from the upstream side of the sucking unit 100 to a downstream side thereof. The recording medium transportation unit has a paper feeding roller 221 for picking up and feeding the recording medium 1 accommodated in the paper tray 212 one by one, a paper feeding roller 12 for feeding the recording medium 1 between the recording head 18 and the sucking unit 100 and a driven roller 12a thereof, a paper discharge roller 16 for discharging the recording medium 1 from the recording section after recording and a spur roller 16a to be a driven roller thereof.

By employing such a structure that the sucking unit 100 can be moved in a discharge direction, it is also possible to prevent the paper discharge roller 16 and the spur roller 16a from being provided. 225 denotes a paper guide member to be provided in a predetermined portion between the rollers. In FIG. 7, moreover, a one-dotted chain line L indicates a transportation path for the recording medium 1 to be delivered by the recording medium transportation apparatus 220.

The recording head 18 is mounted on a carriage 230 supported slidably on a guide shaft (not shown) provided in parallel along directions E and F (a main scanning direction) which are orthogonal to the transportation direction D of the recording medium 1 (a paper feeding direction or a sub-scanning direction), and the carriage 230 slides over a guide shaft (not shown) by a timing belt to be driven by means of a DC motor 32. The recording head 18 has a nozzle train having 96 nozzles, for example, for each color, and ink supplied for each color from an ink cartridge 233 which is removably attached to the carriage 230 is discharged as very small ink particles from all or a part of the nozzles onto the recording medium 1 according to print data.

The sucking unit 100 is provided in a position opposed to the recording head 18 with the transportation path L of the recording medium 1 interposed therebetween, and is formed to take the shape of a hollow box having a two-stage upper and lower structure including a sucking section 101 in an upper stage and a sucking force generating section 104 in a lower stage. The sucking section 101 has a decompression chamber 102 formed in an inner part, a plurality of sucking chambers 106 (area $S_3$) formed to be almost rectangular concave portions on the transportation surface of the recording medium 1 respectively, and a plurality of sucking holes 108 (sectional area $S_1$) extended in a vertical direction in order to cause the sucking chambers 106 to communicate with the decompression chamber 102 respectively.

In the embodiment, the area $S_3$ of the sucking surface opposed to the recording medium 1 is larger than the sectional area $S_1$ of the sucking hole 108 in the sucking chamber 106. The sucking force generating section 104 communicates with the decompression chamber 102 of the sucking section 101 through the communicating hole 110 and includes a pump 112 (flow rate Q) having the centrifugal fan therein. The pump 112 is attached to the predetermined lower position of the decompression chamber 102 in such a state as to communicate with the decompression chamber 102 through a communicating hole 110, and the centrifugal fan is operated during recording.

When a recording instruction is input to the recording medium 1 accommodated in the paper tray 212 by means of a host computer which is not shown, the paper feeding roller 221 of the ASF unit 202 is rotated to pick up and feed the recording medium 1 accommodated in the paper tray 212 one by one, and furthermore, the paper feeding roller 12 is rotated to feed the recording medium 1 between the recording head 18 and the sucking unit 100. On the other hand, the centrifugal fan starts an operation in the sucking unit 100. Consequently, the sucking force of the pump 112 acts on the sucking hole 108 and the sucking chamber 106 through the communicating hole 110 and the decompression chamber 102 to bring an air sucking state.

Subsequently, the recording medium 1 fed into the recording section is sucked into the recording medium transportation surface of the sucking unit 100 and is delivered while holding a close contact state. At the same time, the recording head 18 discharges the ink particles to the recording medium 1 to carry out image recording while moving above the recording medium 1 in the main scanning directions E and F. After the image recording is completed, the recording medium 1 is fed from the recording section through the paper discharge roller 16 and the spur roller 16a to be a driven roller thereof or is fed from the recording section by the movement of the sucking unit 100 and is then discharged from the printer body. At this time, the recording medium 1 does not float by the cockling as described above. Therefore, a spur mark is not left even if the spur roller 16a is used.

According to the invention, as described above, the cockling of the recording medium can be prevented effectively in the recording device. For the recording media having various sizes, a stable transportation can be obtained. Moreover, the recording medium does not float but can be at least concaved. Consequently, the recording medium can be prevented from being pushed against the spur roller. As a result, the spur mark is not left on the recording medium (even if the spur roller is used). Furthermore, the cockling in a plain paper can be prevented. Therefore, it is possible to reduce a paper gap, thereby enhancing printing precision in a special paper.

FIG. 11 is a side view showing a recording medium transportation apparatus according to a third embodiment of the invention. A recording medium transportation apparatus 300 comprises a sucking unit 310 for sucking and holding a recording medium during recording, and a recording medium delivering device 350 for delivering the recording medium from the upstream side of the sucking unit 310 to the downstream side thereof. The sucking unit 310 is provided under a recording head 18 for recording on the recording medium with a recording medium transportation path L interposed therebetween. The recording medium transportation apparatus 300 is formed to take the shape of a hollow box having a two-stage upper and lower structure including a sucking section 320 in an upper stage and a sucking force generating section 330 in a lower stage.

Figure 12A:
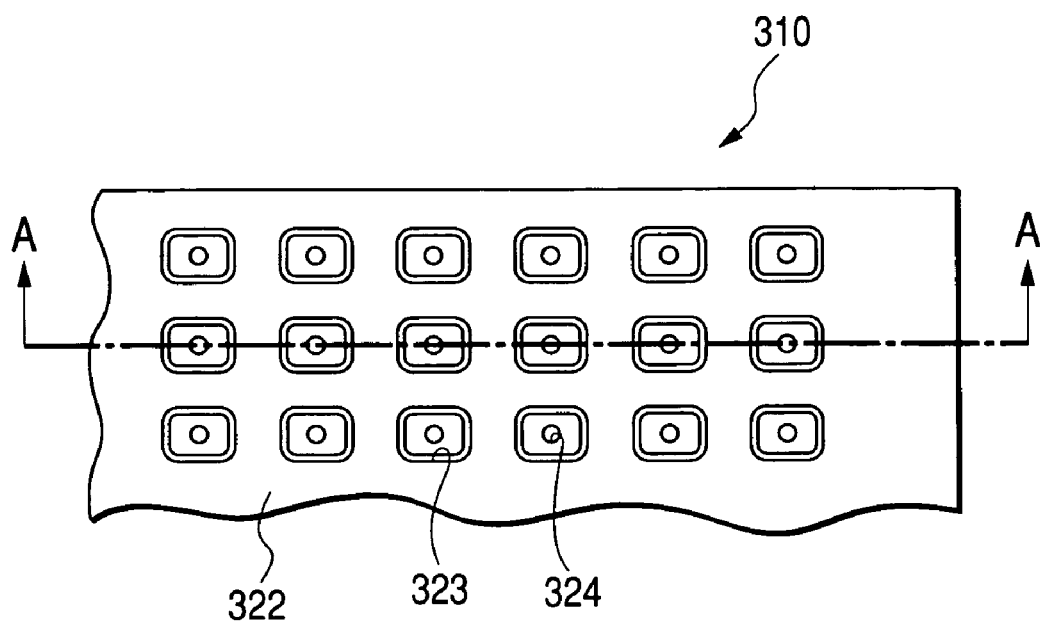
FIGS. 12A and 12B are respectively a plan view and a sectional side view showing the recording medium transportation surface of the recording medium transportation apparatus in FIG. 11.
Figure 12B:
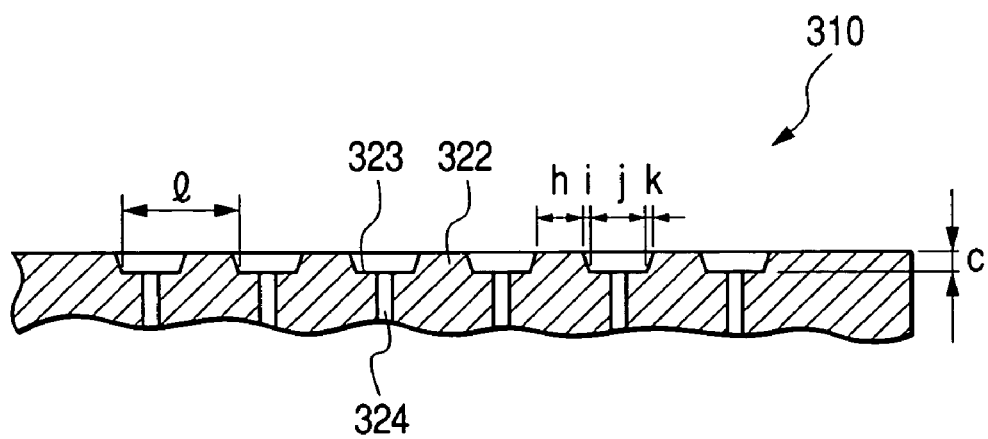

The sucking section 320 has a decompression chamber 321 formed therein, a plurality of sucking chambers 323 formed to be an almost rectangular dimple on a recording medium transportation surface 322 as shown in FIGS. 12A and 12B, and a plurality of sucking holes 324 having smaller sectional areas than those of the sucking chambers 323 which are extended in a vertical direction in order to cause the sucking chambers 323 to communicate with the decompression chamber 321 respectively.

When the recording medium absorbs a moisture by ink, cockling is generated so that a space between the recording medium and a recording medium 18 becomes nonuniform. Consequently, the flight distance of ink drops is varied so that a recording unevenness is caused or the recording medium is contaminated due to a contact with the recording head 18 in some cases. The sucking chamber 323 is formed to absorb such an improper state of the recording medium.

More specifically, the recording medium is extended in a lateral direction when the cockling is generated. At this time, the sucking chamber 323 is formed to have a total extension for absorbing a maximum extension rate. More specifically, a maximum extension rate d of the recording medium is expressed in the following equation (8), wherein the initial length of the recording medium is represented by B and the maximum extension amount of the recording medium is represented by b, and is set to be approximately 1.004 in a plain paper, for example.

$$d=(B+b)/B \quad (8)$$

When a space between the sucking chambers 323 is represented by l as shown in FIG. 12B and an edge length in consideration of a concavo-convex portion therebetween is represented by l+Δl, a length Δl of the concavo-convex portion is determined to form the sucking chamber 323 in order to satisfy the following equation (9).

$$(l+\Delta l)/l \geq d \quad (9)$$

Consequently, the recording medium generating the cockling can come in close contact with the recording medium transportation surface 322 along the sucking chamber 323. Therefore, it is possible to cause a space between the recording medium and the recording head 18 to be uniform, thereby enhancing recording precision. In addition, it is possible to prevent a contamination from being caused by the contact of the recording medium with the recording head 18.

Moreover, it is experimentally apparent that the recording medium is waved with an almost sine curve when the cockling is generated, and the sucking chamber 323 is formed corresponding to a sectional shape at this time. More specifically, as shown in FIG. 12B, the sucking chamber 323 is formed such that spaces between the sucking chambers 323, that is, a distance h of a convex portion, a distance i of a slant face, a distance j of the bottom surface of a concave portion in the sucking chamber 323 and a distance k of a slant face are almost equal.

Figure 13:
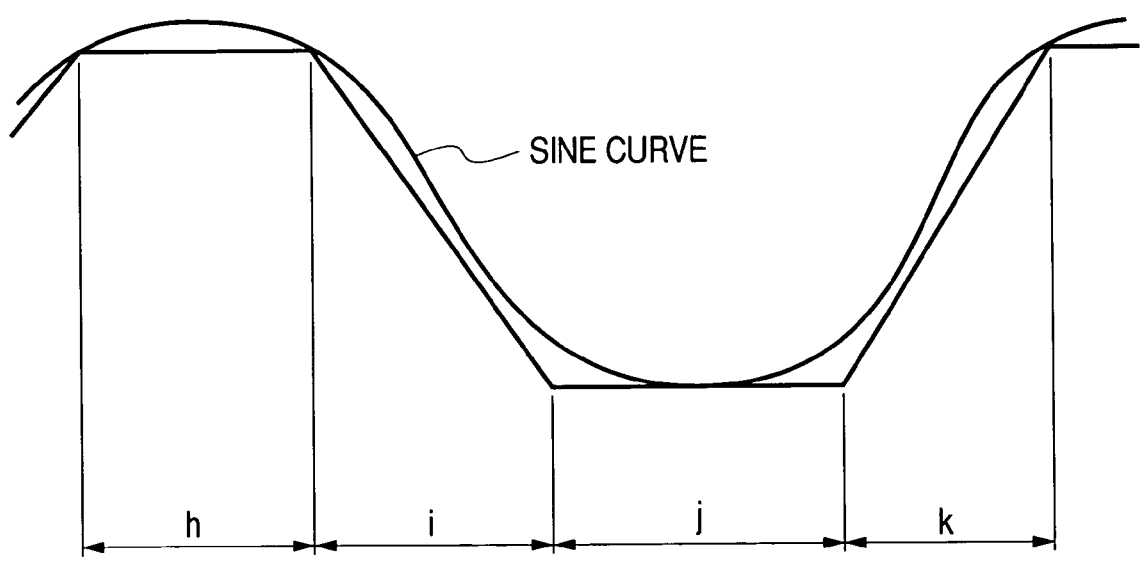
FIG. 13 is a typical view showing the sectional configuration of the recording medium transportation surface of the recording medium transportation apparatus in FIG. 11.

In the case of a plain paper, the sine curve of the cockling has a pitch of approximately 20 mm and an oscillation width of approximately 0.6 mm. Therefore, the sucking chamber 323 is formed such that each of the spaces h, i, j and k of the sucking chamber 323 is 5 mm and a depth c of the sucking chamber 323 is 0.5 mm, for example. As shown in FIG. 13, consequently, the sine curve of the cockling and the sectional shape of the sucking chamber 323 can approximate to each other. Consequently, the recording medium generating the cockling can come in close contact with the recording medium transportation surface 322 along the sucking chamber 323. Therefore, a space between the recording medium and the recording head 18 can be made uniform to enhance recording precision, and furthermore, it is possible to prevent a contamination from being caused by the contact of the recording medium with the recording head 18.

A sucking force generating section 330 communicates with a decompression chamber 321 of a sucking section 320 and a communicating hole 331 includes a pump 332 having a centrifugal fan therein. The pump 332 is attached to the predetermined lower position of the decompression chamber 321 in a communication state with the decompression chamber 321 through the communicating hole 331 and the centrifugal fan is rotated during recording.

As described above, a sucking hole is constituted by a sucking hole 324 and a sucking chamber 323, and furthermore, the sucking hole 324 is formed by a through hole having a small diameter. Consequently, the utilization rate of a negative pressure which can be utilized for the characteristic of the pump 332 is enhanced and the sucking chamber 323 is formed to be an almost rectangular concave portion having a larger area than that of the sucking hole 324. Thus, large sucking force can be generated for the recording medium.

The recording medium delivering device 350 includes a feeding roller 351 for feeding the recording medium between the recording head 18 and the sucking unit 310, a driven roller 352 to be pressed in contact with the feeding roller 351 from above, a discharge roller 353 for discharging the recording medium, and a spur roller 354 to come in contact with the discharge roller 353 from above. By employing such a structure that the sucking unit 310 can be moved in a discharge direction, it is also possible to prevent the discharge roller 353 and the spur roller 354 from being provided. While the sucking chamber 323 is formed to have a total extension for absorbing the maximum extension rate of the recording medium and is formed corresponding to the sectional shape of the recording medium in the embodiment shown in FIG. 11, the sucking chamber 323 may apply one of them.

The recording medium transportation apparatus 300 having such a structure is operated in the following manner. The feeding roller 351 is rotated to feed the recording medium between the recording head 18 and the sucking unit 310. On the other hand, the pump 332 is driven to cause sucking force to act on the sucking hole 324 and the sucking chamber 323 through the communicating hole 331 and the decompression chamber 321. Consequently, the recording medium is delivered in a sucking and sucking state to the recording medium transportation surface 322.

At the same time, the recording head 18 discharges ink particles to the recording medium to carry out recording while moving above the recording medium in a main scanning direction. In some cases, consequently, cockling is generated in the recording medium after the recording. The shape of the cockling is controlled by the driven roller 352 and the recording medium can be caused to come in close contact with the recording medium transportation surface 322 along the sucking chamber 323. Consequently, a space between the recording medium and the recording head 18 is made uniform so that recording precision can be enhanced, and furthermore, a contamination can be prevented from being caused by the contact of the recording medium with the recording head 18. Then, the discharge roller 353 is rotated to discharge, to the outside, the recording medium thus recorded completely.

As described above, according to the recording medium transportation apparatus and the recording device in accordance with the invention, even if the cockling is extended in the transportation direction of the recording medium after the recording, it is absorbed by a dimple. Accordingly, it is possible to cause the space between the recording medium and the recording head to be minimum and uniform, thereby carrying out a stable transportation. Therefore, the recording precision can be enhanced and the contamination can be prevented from being caused by the contact of the recording medium with the recording head.

Figure 14A:
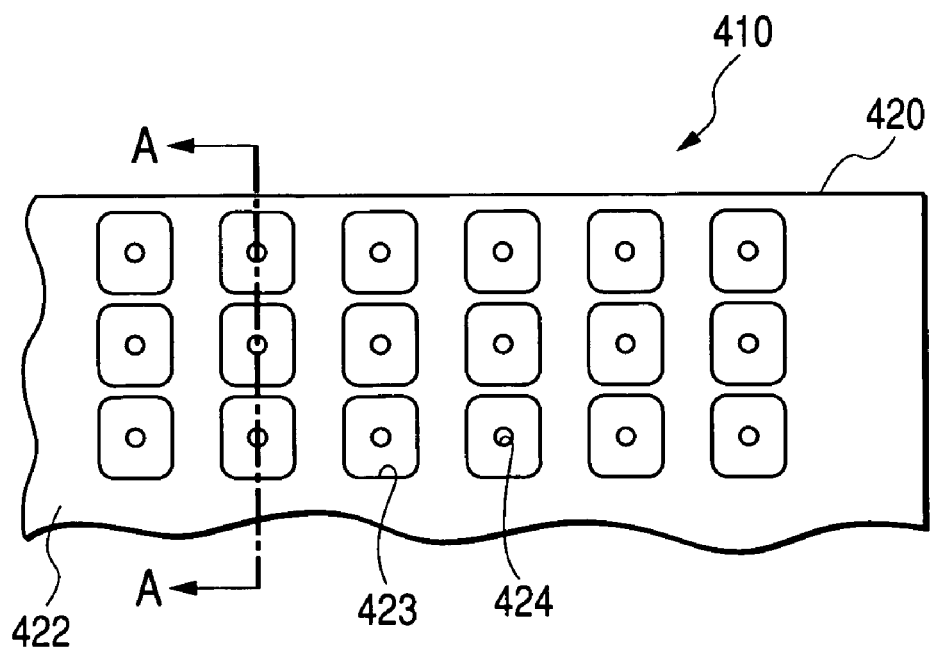
FIGS. 14A and 14B are respectively a plan view and a sectional side view showing the recording medium transportation surface of a recording medium transportation apparatus according to a fourth embodiment of the invention.
Figure 14B:
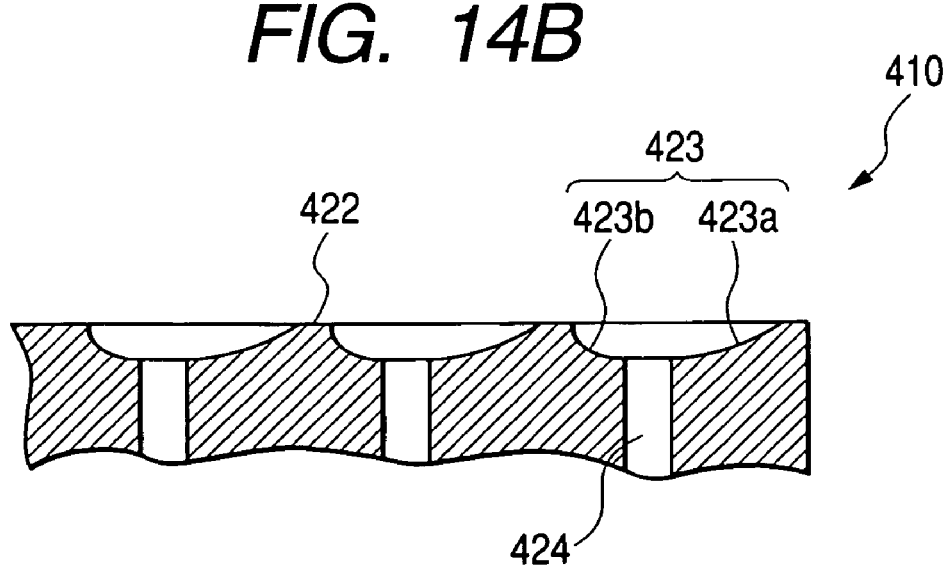

FIGS. 14A and 14B are a plan view and a sectional side view respectively showing a recording medium transportation apparatus according to a fourth embodiment of the invention corresponding to FIGS. 12A and 12B, and the same components have the same numbers and description will be omitted. A sucking section 420 of a sucking unit 410 in a recording medium transportation apparatus 300 includes a decompression chamber 321 formed therein, a plurality of sucking chambers 423 formed to be almost rectangular dimples on a recording medium transportation surface 422 as shown in FIG. 14A, and a plurality of sucking holes 424 having smaller sectional areas than those of the sucking chambers 423 which are extended in a vertical direction.

The sucking chamber 423 is formed such that a depth is changed in the transportation direction of the recording medium. More specifically, as shown in FIG. 14B, a bottom surface 423a from an edge on the upstream side in the transportation direction of the recording medium in the sucking chamber 423 to the sucking hole 424 is formed to be a slant face having a depth which is gradually increased, and a bottom surface 423b from the sucking hole 424 in the sucking chamber 423 to an edge on the downstream side in the transportation direction of the recording medium is formed to be a flat surface having an almost constant depth.

Thus, the bottom surface 423a of the sucking chamber 423 is formed to be a slant face having a depth which is gradually increased. When approaching the sucking chamber 423, consequently, a portion provided under the recording medium is shallow. Therefore, the flow velocity of the flowing air is increased so that a negative pressure is raised. Thus, it is possible to seize an opportunity to take the recording medium into the sucking chamber 423. Moreover, the depth of the bottom surface 423b of the sucking chamber 423 is formed to be a flat surface having an almost constant depth. Consequently, the amount of take-in of the recording medium taken into the sucking chamber 423 can be sufficiently maintained, that is, the amount of extension generated by the cockling can be compensated.

Even if the cockling is extended in the transportation direction of the recording medium, accordingly, the recording medium can be completely sucked into the sucking chamber 423, and furthermore, proper sucking force is generated by the sucking chamber 423. Consequently, it is possible to maintain the feeding precision of the recording medium to be high and to carry out an adsorption and transportation. The space between the recording medium and the recording head 18 can be caused to be uniform so that recording precision can be enhanced, and furthermore, a contamination can be prevented from being caused by the contact of the recording medium with the recording head 18.

As described above, the sucking hole is constituted by the sucking hole 424 and the sucking chamber 423, and furthermore, the sucking hole 424 is formed by a through hole having a small diameter. Consequently, the utilization rate of a negative pressure which can be utilized for the characteristic of the pump 332 is enhanced, and furthermore, the sucking chamber 423 is formed to be an almost rectangular concave portion having a larger area than the area of the sucking hole 424. Thus, large sucking force can be generated for the recording medium.

In such a structure, the feeding roller 351 is rotated to feed the recording medium between the recording head 18 and the sucking unit 410. On the other hand, the pump 332 is driven to cause the sucking force to act on the sucking hole 424 and the sucking chamber 423 through the communicating hole 331 and the decompression chamber 321. Consequently, the recording medium is delivered in a sucking state to the recording medium transportation surface 422.

At the same time, the recording head 18 discharges ink particles to the recording medium to carry out recording while moving above the recording medium in a main scanning direction. In some cases, consequently, cockling is generated in the recording medium after the recording. The recording medium is taken into the sucking chamber 423 and can be thus sucked completely. Consequently, a space between the recording medium and the recording head 18 is made uniform so that recording precision can be enhanced, and furthermore, a contamination can be prevented from being caused by the contact of the recording medium with the recording head 18. Then, the discharge roller 353 is rotated to discharge, to the outside, the recording medium thus recorded completely.

As described above, according to the recording medium transportation apparatus and the recording device in accordance with the invention, the recording medium can be taken into the dimple. Therefore, even if the cockling is extended in the transportation direction of the recording medium, it is possible to cause the space between the recording medium and the recording head to be uniform, thereby enhancing recording precision. In addition, the contamination can be prevented from being caused by the contact of the recording medium with the recording head.

In the case of a plain paper, moreover, the sucking force is set to be comparatively large so that the cockling is reduced, and furthermore, transportation precision is slightly deteriorated by an increase in the sucking force. It is possible to obtain the same printing picture quality as that in the conventional art with an enhancement in impact precision which is generated by a reduction in a paper gap.

Figure 15:
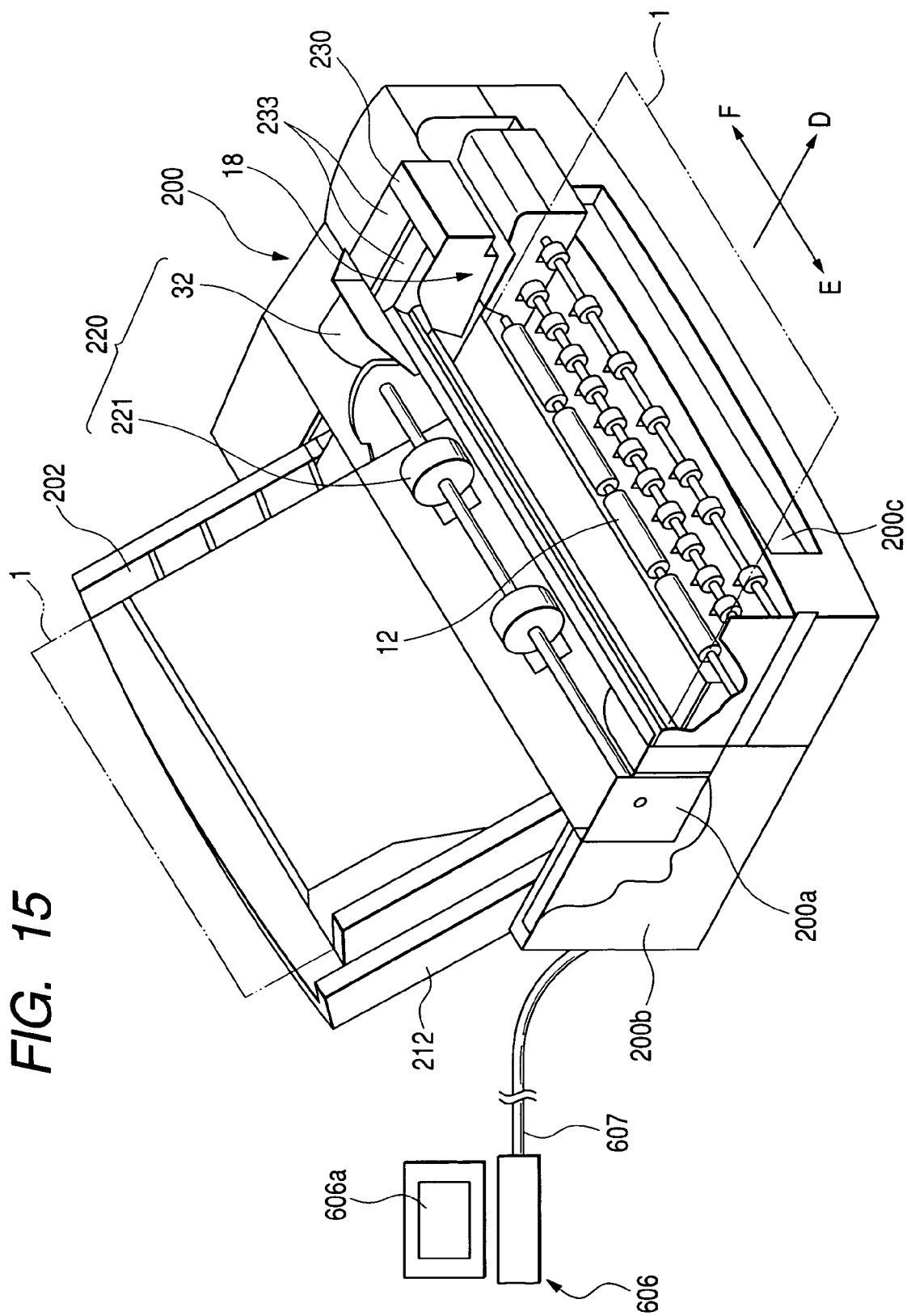
FIG. 15 is a view showing an ink jet printer to be a recording device incorporating a recording medium transportation apparatus according to a fifth embodiment of the invention.

FIG. 15 is a view showing an ink jet printer to be a recording device incorporating a recording medium transportation apparatus according to a fifth embodiment of the invention corresponding to FIG. 6, and the same components have the same numbers and description will be omitted. The ink jet printer is connected to a personal computer 606 to be a computer as a control apparatus through a connecting cable 607.

A so-called printer driver 608 to be a driver software for controlling the driving operation of the ink jet printer is installed in the personal computer 606. In the case in which the personal computer 606 carries out printing by means of the ink jet printer, a control signal is sent from the printer driver 608 to the ink jet printer as shown in FIG. 17.

Figure 16:
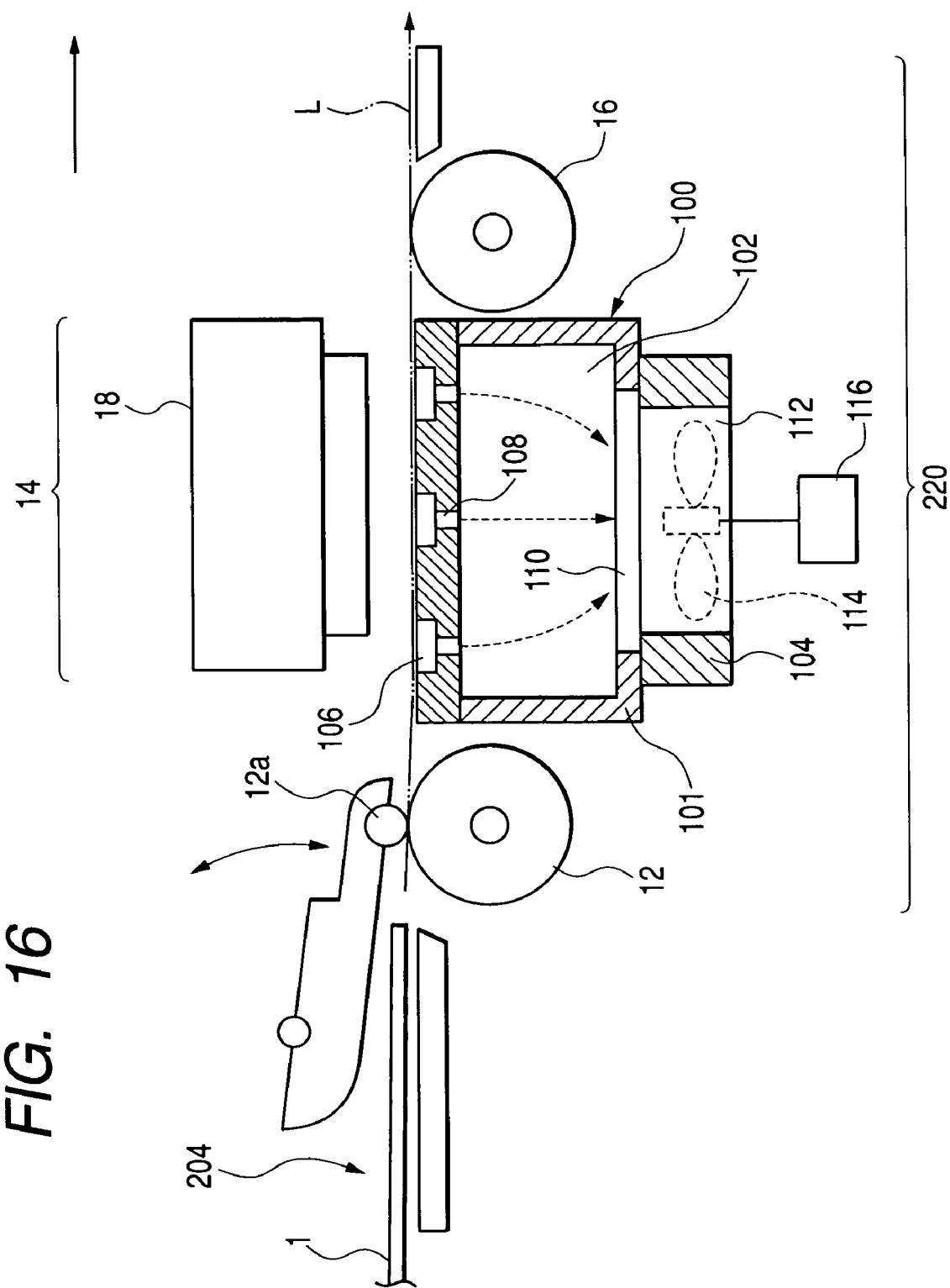
FIG. 16 is a schematic sectional view showing the recording medium transportation apparatus in the ink jet printer of FIG. 15.

FIG. 16 is a sectional view showing the structure of the main part of a recording medium transportation apparatus according to a fifth embodiment of the invention corresponding to FIG. 7, and the same components have the same numbers and description will be omitted. A pump 112 of a sucking unit 100 of a recording medium transportation apparatus 220 is attached to a predetermined lower position of a decompression chamber 102 in a communication state with the decompression chamber 102 through a communicating hole 110, and a centrifugal fan 114 is rotated during recording. The driving operation of the centrifugal fan 114 is controlled by a driving control section 116.

The driving control section 116 rotates the centrifugal fan 114 at a comparatively high speed to generate comparatively large sucking force in the case in which a recording medium 1 is a plain paper, and is rotated at a comparatively low speed to generate comparatively small sucking force in the case in which the recording medium 1 is a special paper. Consequently, cockling can be suppressed to be small even if the recording medium 1 is the plain paper or the special paper. The driving control section 116 is controlled by a printer driver 608 to be a user interface installed in the personal computer 606 and the change of the sucking force, that is, the change of the rotating speed of the centrifugal fan 114 is also set by the printer driver 608.

The printer driver 608 carries out sucking force setting 608*b* corresponding to a type (a recording medium type) 608*a* of the recording medium 1 set by a user and controls the driving control section 116 in the sucking unit 100 of the ink jet printer to set the sucking force based on the sucking force setting. In this case, the printer driver 608 includes a table 609 comprising the recording medium type and the sucking force setting as shown in FIG. 19, and serves to carry out the sucking force setting by the table 609 corresponding to the type of the recording medium 1 set by the user.

A portion corresponding to the sucking hole in a conventional sucking structure is formed by a sucking chamber 106 and a sucking hole 108, and the sucking hole 108 is formed by a through hole having a small diameter. Consequently, the utilization rate of a negative pressure which can be utilized for a pump characteristic is enhanced and the sucking chamber 106 forming a surface opposed to the recording medium is formed to be an almost rectangular concave portion having a larger area. Consequently, large sucking force for the recording medium can be generated.

The recording medium transportation apparatus 220 according to the embodiment has the structure described above and is operated in the following manner. First of all, the user calls the set screen of the printer driver 608 through the personal computer 606 and inputs the kind of the recording medium 1 to be used to set the recording medium type 608*a* in accordance with the set screen displayed on a screen 606*a*. Consequently, the printer driver 608 carries out the sucking force setting 608*b* based on the recording medium type 608*a* in accordance with the table 609, and the sucking force setting is sent as a control signal to the driving control section 116 of the sucking unit 100 of the ink jet printer. Consequently, the driving control section 116 sets the number of rotations of the centrifugal fan 114.

Next, when a recording instruction for the recording medium 1 accommodated in a paper tray 12*a* is input from the personal computer 606 through the printer driver 608, the paper feeding roller of an ASF unit is rotated to pick up and feed the recording medium 1 accommodated in the paper tray 12*a* one by one, and furthermore, the paper feeding roller 12 of the recording medium delivering device 220 is rotated to deliver and feed the recording medium 1 between the recording head 18 and the sucking unit 100.

On the other hand, in the sucking unit 100, the centrifugal fan starts a rotation at the number of rotations which is set by the driving control section 116 so that the sucking force applied from the pump 112 acts on the sucking hole 108 and the sucking chamber 106 through the communicating hole 110 and the decompression chamber 102, thereby bringing an air sucking state. The sucking force generated at this time has a value corresponding to the type of the recording medium 1 which is set by the user over the set screen of the printer driver 608, that is, large sucking force is generated in the case of a plain paper and small sucking force is generated in the case of a special paper.

Consequently, the recording medium 1 fed into the recording section 14 is sucked in the recording medium transportation surface of the sucking unit 100 and a close contact state is held and delivered. At the same time, the recording head 18 discharges ink particles to the recording medium 1 to carry out image recording while moving above the recording head 1 in main scanning directions E and F. Then, when the recording medium 1 is completely printed, the rear edge of the recording medium 1 is released between the paper feeding roller 12 and the driven roller 12*a* in the recording medium delivering device, and furthermore, is discharged by a paper discharge roller 16.

In this case, as described above, since the recording medium 1 is sucked and held by optimum sucking force with respect to the recording medium transportation surface by the sucking unit 100 during printing through the recording head 18 corresponding to the type, it does not float due to the cockling. Since a paper gap is set to be small, the impact precision of the ink particles discharged from the recording head 18 is enhanced so that printing picture quality can be improved in the case in which the recording medium 1 is a special paper.

In the case in which the recording medium 1 is a plain paper, moreover, the sucking force is set to be comparatively large so that the cockling can be reduced. In that case, transportation precision is slightly deteriorated. Since the impact precision of the ink particle is enhanced by a reduction in the paper gap, almost the same printing picture quality as that of the conventional ink jet printer can be obtained.

As described above, according to the invention, the sucking force is changed by a user interface depending on the type of the recording medium. Consequently, the sucking device increases the sucking force to suppress the cockling in the case of a plain paper having comparatively large cockling. Consequently, it is possible to reduce the paper gap between the recording medium and the recording head. Thus, the impact precision of the ink particle discharged from the nozzle of the recording head can be enhanced, and particularly, the printing picture quality can be improved in the case of a special paper.

Figure 20:
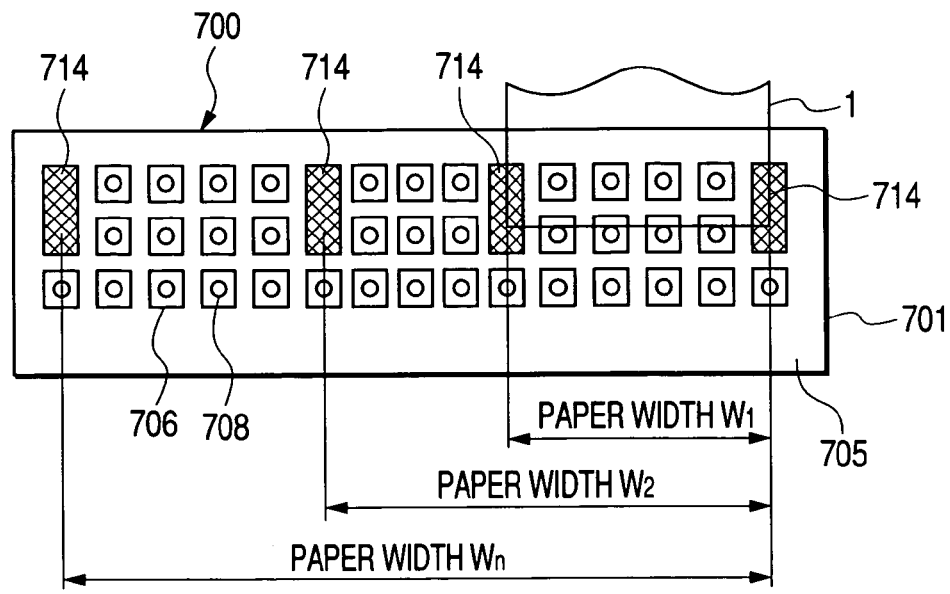
FIG. 20 is a plan view showing the sucking unit of a recording medium transportation apparatus according to a sixth embodiment of the invention.

FIG. 20 is a plan view showing the sucking unit of a recording medium transportation apparatus according to a sixth embodiment of the invention. A sucking section 701 of a sucking unit 700 of a recording medium transportation apparatus 220 comprises a plurality of sucking chambers 706 formed to be almost rectangular concave portions on a transportation surface 705 of a recording medium 1 respectively, and a plurality of sucking holes 708 having small sectional areas than those of the sucking chambers 706 extended in a vertical direction in order to cause the sucking chambers 706 to communicate with the decompression chambers 102 respectively.

A portion corresponding to the sucking hole in a conventional sucking structure is formed by a sucking chamber 706 and a sucking hole 708, and the sucking hole 708 is formed by a through hole having a small diameter. Consequently, the utilization rate of a negative pressure which can be utilized for a pump characteristic is enhanced and the sucking chamber 706 forming a surface opposed to the recording medium is formed to be an almost rectangular concave portion having a larger area. Consequently, large sucking force for the recording medium can be generated.

Figure 21:
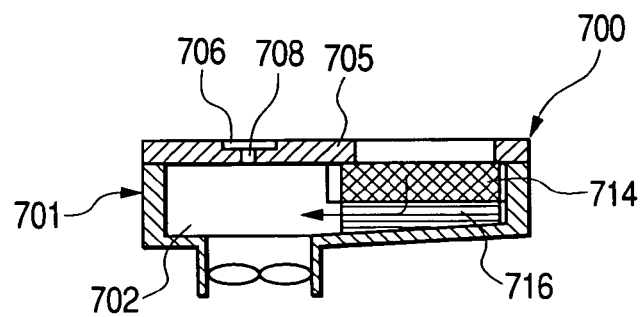
FIG. 21 is a longitudinal sectional view showing the sucking unit of FIG. 20.

Moreover, the recording medium transportation surface 705 to be the surface of the sucking section 701 is provided with a hard porous material 714 in positions corresponding to paper widths W1, W2, . . . , Wn of various recording media 1 to be used for printing, that is, positions set apart leftwards at central distances W1, W2, . . . , Wn with respect to a common position on the right end in FIG. 20. The hard porous material 714 is constituted by an urethane material, for example, and is embedded in the recording medium transportation surface 705 and a surface thereof is placed in a slightly low position from the recording medium transportation surface as shown in FIG. 21.

Furthermore, an absorbent 716 is provided under the hard porous material 714 and a space in which the absorbent 716 is accommodated communicates with the decompression chamber 702. The absorbent 716 is constituted by felt, for example, and the hard porous material 714 is provided thereon, and therefore, does not need to be hard. The hard porous material 714 and the absorbent 716 are removably attached to the sucking section 701 and can easily be exchanged.

The recording medium transportation apparatus 220 according to the embodiment has the structure described above and is operated in the following manner. The recording medium 1 fed into a recording section 14 is sucked into the recording medium transportation surface 705 of the sucking unit 700 and is delivered while holding a close contact state. At the same time, the recording head 18 discharges ink particles to the recording medium 1 to carry out image recording while moving above the recording medium 1 in main scanning directions E and F. Then, when the recording medium 1 is completely printed, the rear edge of the recording medium 1 is released between the paper feeding roller 122 and the driven roller 124 in the recording medium delivering device, and furthermore, is discharged by a paper discharge roller 124.

In this case, as described above, the recording medium transportation surface 705 includes the hard porous material 714 in positions corresponding to both side edges of the recording medium 1. In the case of frameless printing for the recording medium 1, therefore, the ink particle discharged from the recording head 18 impacts as a waste ink mist on the hard porous material 714 corresponding to the outside of both side edges of the recording medium 1 in relation to the paper width W1 of the recording medium 1, for example. The waste ink mist impacting on the hard porous material 714 is absorbed into the hard porous material 714 and is absorbed into the absorbent 716 in accordance with a gravity.

On the other hand, air is circulated from the recording medium transportation surface 705 into the hard porous material 714 and the absorbent 716 through the hard porous material 714 and the absorbent 716 by the sucking force of the pump 112. By the airflow, consequently, the evaporation of water contained in the waste ink mist absorbed into the hard porous material 714 and the absorbent 716 is promoted.

Accordingly, the absorption capability of the waste ink mist of the hard porous material 714 and the absorbent 716 is enhanced so that the sizes of the hard porous material 714 and the absorbent 716 can be reduced. In the case in which the hard porous material 714 and the absorbent 716 absorb a large amount of waste ink mists and is thus contaminated due to the use for a long period of time, they can be exchanged.

Figure 22:
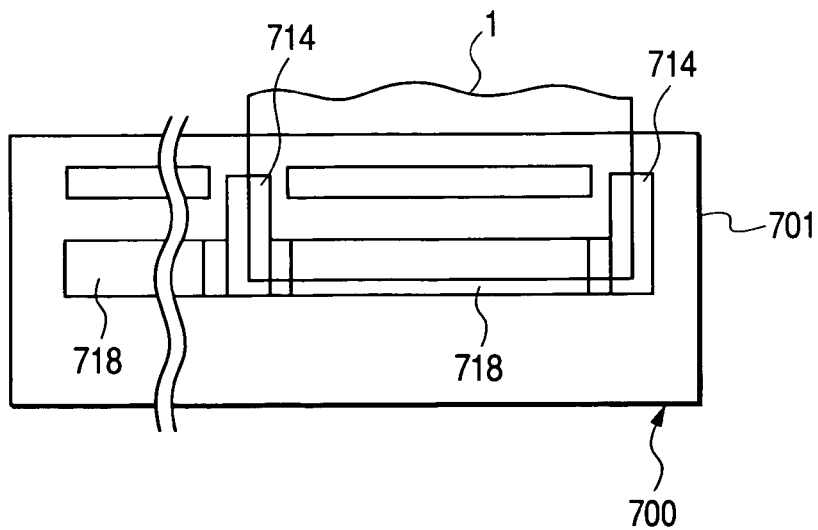
FIG. 22 is a schematic sectional view showing a recording medium transportation apparatus according to a seventh embodiment of the invention.

FIG. 22 is a schematic sectional view showing a recording medium transportation apparatus according to a seventh embodiment of the invention corresponding to FIG. 21, and the same components have the same numbers and description will be omitted. The recording medium transportation apparatus has a different structure from that of the recording medium transportation apparatus shown in FIG. 21 in the following respects. More specifically, a recording medium transportation surface 705 to be the surface of an absorbing section 701 includes a second hard porous material 718 extended in a lateral direction over the whole width of a paper to be used, and a second absorbent (not shown) provided thereunder.

The second hard porous material 718 and the second absorbent are constituted in the same manner as the hard porous material 714 and the absorbent 716, and furthermore, is constituted such that air is circulated by a sucking device. In FIG. 22, a sucking chamber 106 and a sucking hole 108 which are provided on the recording medium transportation surface 705 are not shown.

The recording medium transportation apparatus having such a structure is operated in the same manner as the recording medium transportation apparatus shown in FIG. 21 so that a waste ink mist is absorbed by the hard porous material 714 on both side edges of the recording medium 1 during frameless printing and the waste ink mist in the upper and lower edges of the recording medium 1 is absorbed by the second hard porous material 718 and the second absorbent provided thereunder.

Accordingly, the water of the waste ink mist absorbed by the second hard porous material 718 and the second absorbent provided thereunder is promoted to be evaporated by the suction of the pump 112 in the same manner as the waste ink mist absorbed in the hard porous material 714 and the absorbent 716. During the frameless printing of the recording medium 1, thus, the waste ink mist on the whole peripheral edge of the recording medium 1 is absorbed by the hard porous material 714 and the absorbent 716, and the second hard porous material 718 and the second absorbent. Therefore, the waste ink mist can be prevented from being stuck onto the recording medium transportation surface 705, resulting in a contamination of another recording medium 1. Furthermore, the water of the waste ink mist absorbed by the hard porous material 714 and the absorbent 716, and the second hard porous material 718 and the second absorbent is promoted to be evaporated by an air flow generated by a sucking unit 700.

As described above, according to the invention, even if ink particles supplied from the recording head impact as a so-called waste ink mist on the recording medium transportation surface of the sucking unit at the outside from the peripheral edge of the recording medium in frameless printing, the hard porous material is provided in the vicinity of an impact position so that the waste ink mist impacts on the hard porous material. Consequently, the waste ink mist does not stay in the surface of the hard porous material but is absorbed in the hard porous material. Accordingly, the recording medium can be prevented from being contaminated by the waste ink mist remaining on the recording medium transportation surface of the sucking unit. Furthermore, the porous material for absorbing the waste ink mist is hard. Even if force is applied to the porous material for some reason, therefore, it is possible to prevent the porous material from being deformed, resulting in the flow of the absorbed waste ink mist.

Figure 23:
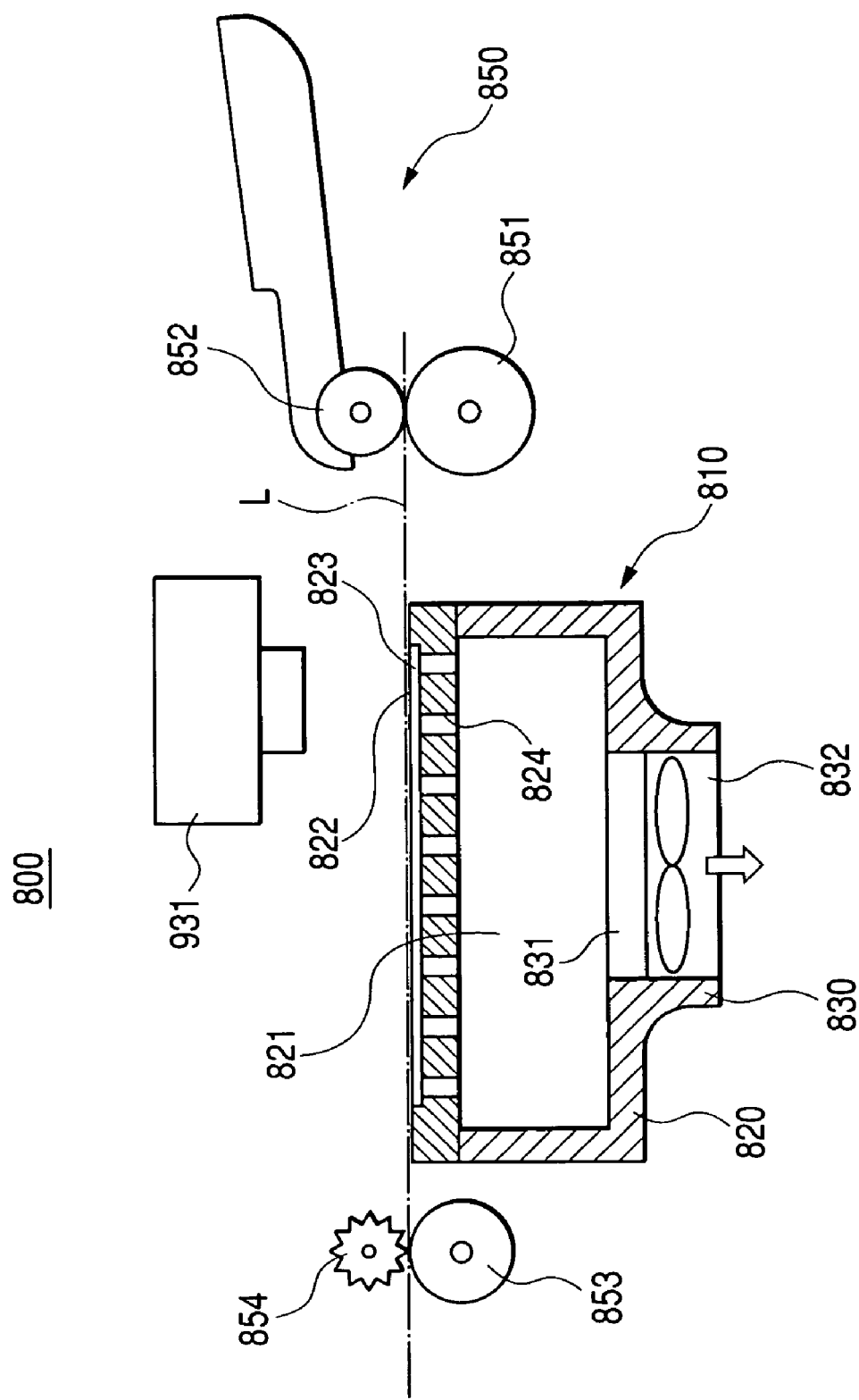
FIG. 23 is a side view showing a recording medium transportation apparatus according to an eighth embodiment of the invention.

FIG. 23 shows a sectional view showing a recording medium transportation apparatus according to an eighth embodiment of the invention. A recording medium transportation apparatus 800 comprises a sucking unit 810 for sucking and holding a recording medium during recording, and a recording medium delivering device 850 for delivering the recording medium from the upstream side of the sucking unit 810 to the downstream side thereof. The sucking unit 810 is provided under a recording head 931 for recording on the recording medium with a recording medium transportation path L interposed therebetween. The recording medium transportation apparatus 800 is formed to take the shape of a hollow box having a two-stage upper and lower structure including a sucking section 820 in an upper stage and a sucking force generating section 830 in a lower stage.

A sucking section 820 has a decompression chamber 821 formed in an inner part, a plurality of sucking chambers 823 formed, on a recording medium transportation surface 822, to be concave portions which take a long rectangular shape in the transportation direction of a recording medium, and a plurality of sucking holes 824 to be the characteristic features of the embodiment which are extended in a vertical direction and have smaller circular sectional areas than the sectional areas of the sucking chambers 823 in order to cause the sucking chambers 823 to communicate with the decompression chamber 821 respectively.

Figure 24A:
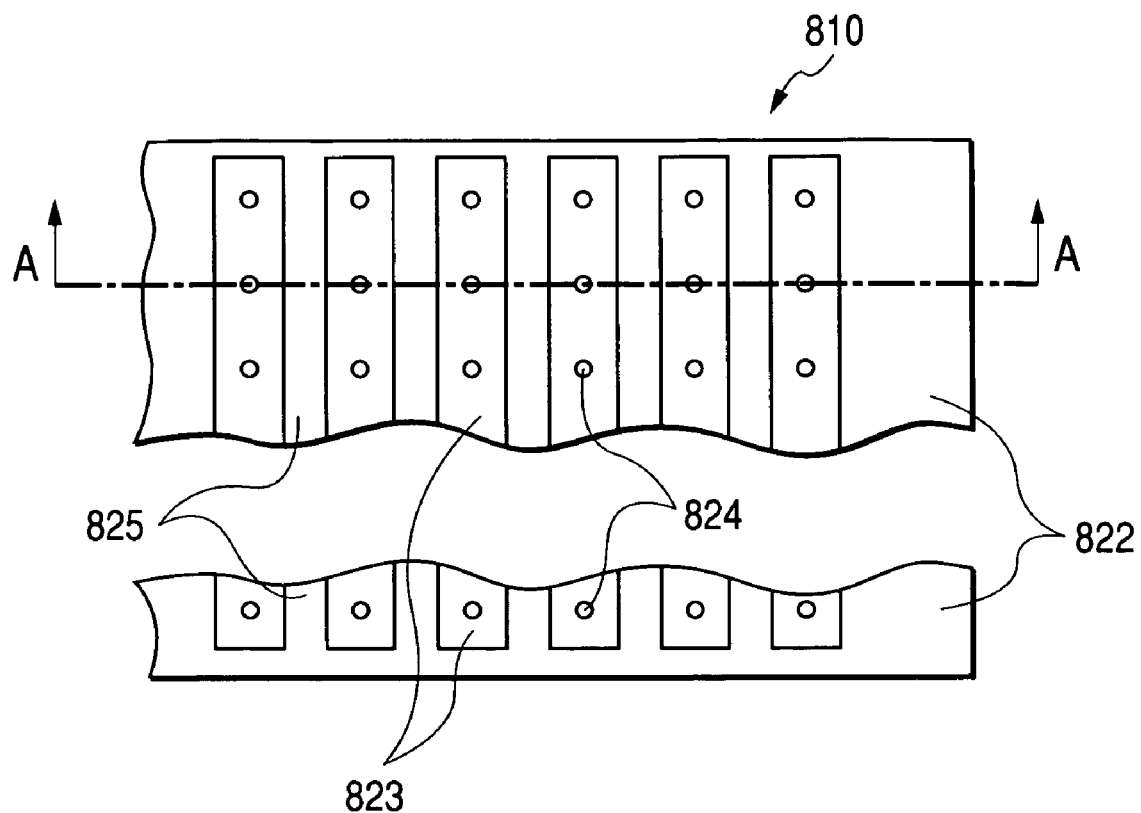
FIG. 24A is a plan view showing a sucking section in FIG. 23
Figure 24B:
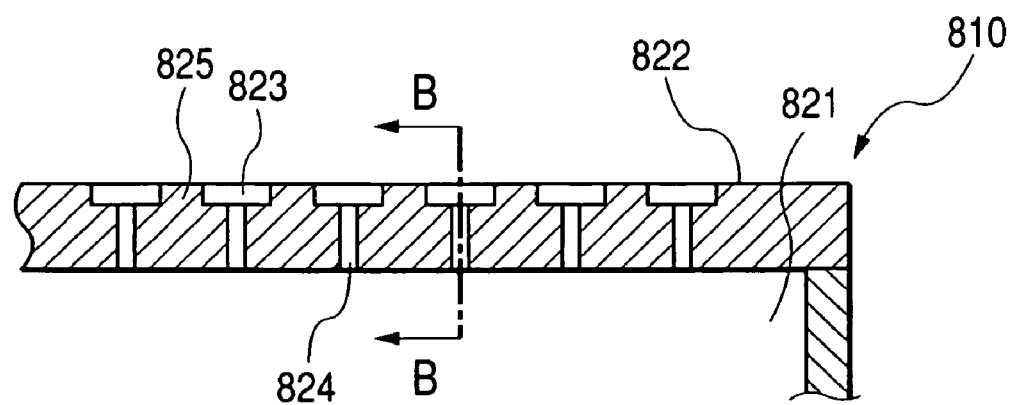
FIG. 24B is a sectional side view taken along an A—A line.

FIGS. 24A and 24B are a plan view showing the sucking section 820 and a sectional side view taken along an A—A line. The sucking chamber 823 is formed in such a manner that a short side has a predetermined length and a long side has a length from the vicinity of an upstream end to the vicinity of a downstream end in the recording medium transportation surface 822. More specifically, the sucking chambers 823 are extended in communication with each other in the transportation direction of the recording medium and are arranged with a partition wall 825 interposed therebetween in a direction which is orthogonal to the transportation direction of the recording medium. The sucking hole 824 is formed on the bottom face of the sucking chamber 823 at a predetermined pitch in the transportation direction of the recording medium. More specifically, the sucking hole 824 is formed in a line for each sucking chamber 823.

A sucking force generating portion 830 communicates with the decompression chamber 821 of the sucking section 820 through a communicating hole 831, and includes a pump 832 having a centrifugal fan in an inner part. The pump 832 is attached into a predetermined position under the decompression chamber 821 through the communicating hole 831 in a communication state with the decompression chamber 821, and the centrifugal fan is rotated during recording.

A recording medium delivering device 850 includes a feeding roller 851 for feeding a recording medium to a portion between a recording head 931 and a sucking unit 810, a driven roller 852 which is caused to come in pressure contact with the feeding roller 851 from above, a discharge roller 853 for discharging the recording medium to an outside, and a spur roller 854 which is caused to come in contact with the discharge roller 853 from above. If the sucking unit 810 can be moved in a discharge direction, the discharge roller 853 and the spur roller 854 do not need to be provided.

As described above, a sucking opening is constituted by the sucking hole 824 and the sucking chamber 823, and furthermore, the sucking hole 824 is formed by a through hole having a small diameter. Consequently, the utilization rate of a negative pressure which can be utilized for the characteristic of the pump 832 is increased and the sucking chamber 823 is formed to be an almost rectangular concave portion having a larger area than the area of the sucking hole 824. Consequently, it is possible to generate a great sucking force for the recording medium.

As described in the related art, in some cases in which the sucking hole 824 is provided, a harsh sucking sound is generated on various conditions. As a result of various investigations made by the inventor, it was found that the generation of the sucking sound is caused by the separation and periodic fluctuation of the vortex of an air flow which is generated over the edge of the sucking hole 824. A vortex frequency f is expressed in the following equation (1).

$$f = St(U/D) \qquad (1)$$

(St: Strouhal number, U: flow velocity, D: diameter of the sucking hole 824)

The reason is as follows. It has been confirmed that an interval is increased in proportion to an increase in a flow rate and the flow velocity U, the interval is increased when the diameter D (characteristic length) of the sucking hole 824 is reduced, the interval is not changed even if the natural frequency of the sucking section 820 (sucking panel) is varied, and the resonance of the sucking section 820 is not caused. It is decided that the generation of the sucking sound is caused by the vortex separation. As measures for eliminating the sucking sound, accordingly, it is effective to suppress the separation of the vortex of the air flow which is generated over the edge of the sucking hole 824.

Moreover, a negative pressure generated by a suction for the recording medium which is the most important in the sucking section 820 is generated by the vortex loss of the air flow which is caused by the suction. The vortex loss of the air flow is caused even if the vortex of the airflow does not separate. Accordingly, it is possible to cause the elimination of the sucking sound to be compatible with the generation of the negative pressure by suppressing the separation of the vortex of the air flow which is generated over the edge of the sucking hole 824.

As a result of various investigations made by the inventor, it was found that the vortex of an air flow to separate with difficulty can be generated over the edge of the sucking hole 824 by chamfering the air inlet portion and the air outlet portion in the sucking hole 824. It is the most effective that the chamfering is carried out over both the air inlet portion and the air outlet portion in the sucking hole 824 in order to generate the vortex of the air flow to separate with difficulty over the edge of the sucking hole 824, and the chamfering may be carried out over only one of them.

Figure 25:
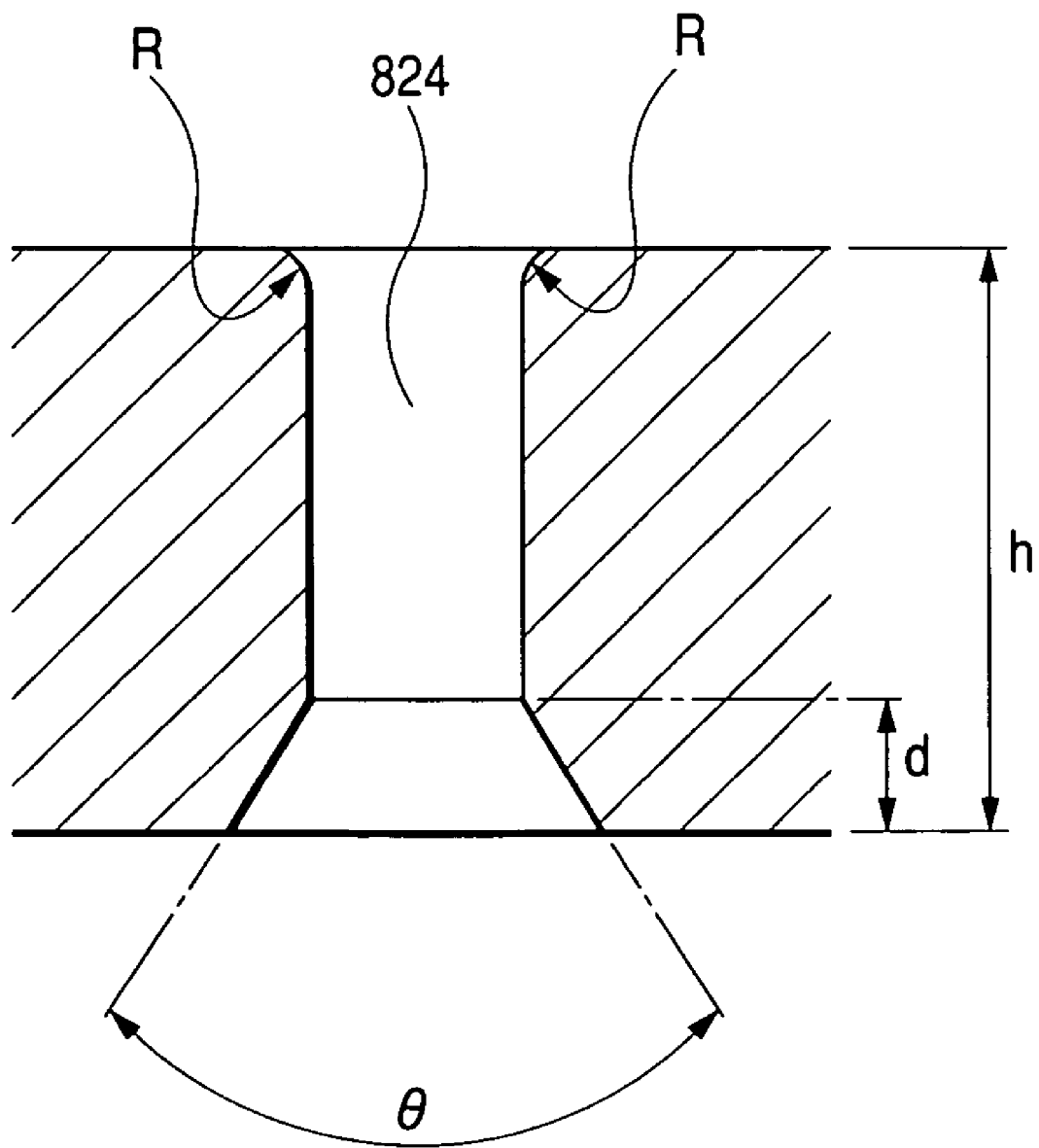
FIG. 25 is a sectional side view showing the details of a sucking hole in FIGS. 24A and 24B.

FIG. 25 is a sectional side view showing the details of the sucking hole 824. It is the most effective that a surface of a chamfer 826a to be carried out over an air inlet portion 824a of the sucking hole 824 has a sectional ridge line taking the shape of a circular arc, that is, is round in order to generate the vortex of the air flow to separate with difficulty over the edge of the sucking hole 824, and it is the most effective that a surface of a chamfer 826b to be carried out over an air outlet portion 824b has a sectional ridge line which is inclined, that is, is tapered in order to generate the vortex of the air flow to separate with difficulty over the edge of the sucking hole 824. Therefore, there were investigated the formation dimensions of the chamfers 826a and 826b for generating the vortex of the air flow to separate with difficulty over the edge of the sucking hole 824.

Figure 26A:
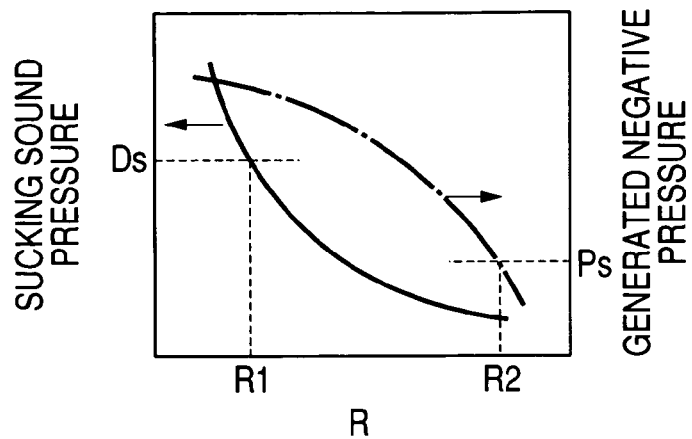
FIGS. 26A, 26B and 26C are charts showing the relationships between a sucking sound pressure and a generated negative pressure in a change of the shape of each chamfer in FIG. 25.
Figure 26B:
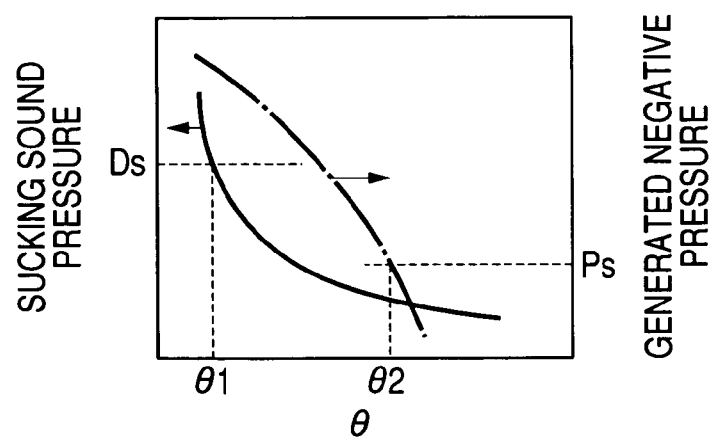
Figure 26C:
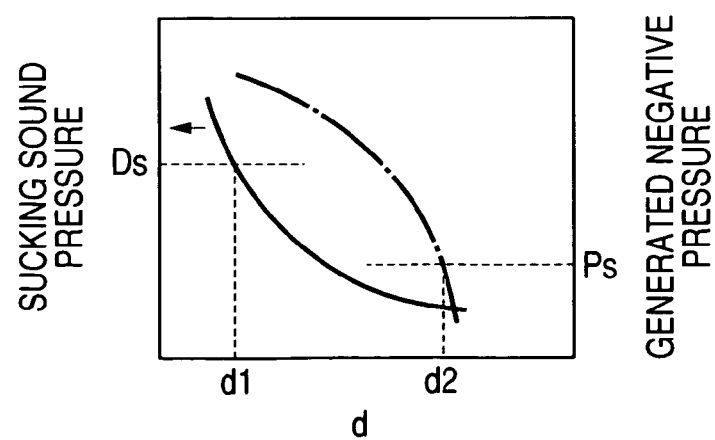

FIGS. 26A, 26B and 26C are charts showing the relationships between a sucking sound pressure and a generated negative pressure in a change of the shapes of the chamfers 826a and 826b. As shown in FIG. 26A, the separation of the vortex of an air flow is decreased so that the sucking sound pressure shown in a solid line is sharply dropped when the radius of the rounded surface R (a radius of a circular arc shown in FIG. 25) is increased, and the generation of the vortex of the air flow to separate with difficulty (the vortex loss) is decreased so that the generated negative pressure shown in a one-dotted chain line is also dropped gradually when the radius of the rounded surface R is further increased. The drop in the sucking sound pressure indicates that a sound eliminating effect is more enhanced. However, the drop in the generated negative pressure indicates that a force for sucking the recording medium is reduced. For this reason, it is necessary to form the rounded surface R within such a range as to balance both of them. Accordingly, it is preferable that the rounded surface R should be formed within a range of R1 to R2 from a maximum allowable value Ds of the sucking sound pressure to a minimum allowable value Ps of the generated negative pressure. More specifically, R1 to R2 desirably ranges from 0.2 mm to 1 mm, and suitably, from 0.3 mm to 0.6 mm.

As shown in FIG. 26B, moreover, the separation of the vortex of the air flow is decreased so that the sucking sound pressure shown in a solid line is sharply dropped when θ of the taper surface (an opening angle of a taper shown in FIG. 25) is increased, and the generation of the vortex of the air flow to separate with difficulty (the vortex loss) is decreased so that the generated negative pressure shown in a one-dotted chain line is also dropped gradually when θ of the taper surface is further increased. The drop in the sucking sound pressure indicates that the sound eliminating effect is more enhanced. However, the drop in the generated negative pressure indicates that the force for sucking the recording medium is reduced. For this reason, it is necessary to form the taper surface within such a range as to balance both of them. Accordingly, it is preferable that the taper surface should be formed within a range of θ1 to θ2 from the maximum allowable value Ds of the sucking sound pressure to the minimum allowable value Ps of the generated negative pressure. More specifically, it is desirable that θ1 to θ2 should range from 60 degrees to 90 degrees.

As shown in FIG. 26C, furthermore, the separation of the vortex of the air flow is decreased so that the sucking sound pressure shown in a solid line is sharply dropped when d of the taper surface (a line length of a section in the axial direction of the taper shown in FIG. 25) is increased, and the generation of the vortex of the air flow to separate with difficulty (the vortex loss) is decreased so that the generated negative pressure shown in a one-dotted chain line is also dropped gradually when d of the taper surface is further increased. The drop in the sucking sound pressure indicates that the sound eliminating effect is more enhanced. However, the drop in the generated negative pressure indicates that the force for sucking the recording medium is reduced. For this reason, it is necessary to form the taper surface within such a range as to balance both of them. Accordingly, it is preferable that the taper surface should be formed within a range of d1 to d2 from the maximum allowable value Ds of the sucking sound pressure to the minimum allowable value Ps of the generated negative pressure. More specifically, it is desirable that d1 to d2 should range from 1 mm to 2 mm.

As a result of various investigations made by the inventor, it was found that the swing of the vortex of the air flow which separates can be diffused and thinned to be uniform and the sucking sound can be thus decreased sharply by suppressing the fluctuation in the vortex of the air flow which separates. In order to suppress the fluctuation in the vortex of the air flow which separates, it is desirable that a length h of the sucking hole 824 (see FIG. 25) should be set to be a predetermined length or more, specifically, 6 mm or more. The sucking hole 824 having the length h or more may be formed singly or in a combination of the formation of the rounded surface R and that of the taper surface. In this case, a plate to form the recording medium transportation surface 822 is thickened so that a weight is increased and a cost is also increased. Consequently, it is possible to decrease a weight and to reduce a cost by adding a plastic or a metallic component to only a portion on which the sucking hole 824 is to be formed, thereby providing the sucking hole 824 having the length h or more.

A recording medium transportation apparatus 800 having such a structure is operated in the following manner. The feeding roller 851 is rotated to feed a recording medium into a portion between the recording head 931 and the sucking unit 810. On the other hand, the pump 832 is driven to cause a sucking force to act on the sucking hole 824 and the sucking chamber 823 through the communicating hole 831 and the decompression chamber 821. Consequently, the recording medium is delivered in a state as to be sucked into the recording medium transportation surface 822. At this time, the sucking sound can be so suppressed as to be almost disregarded by a user because the separation of the vortex of the air flow which is generated over the edge of the sucking hole 824 is reduced by the chamfers 826a and 826b formed on the sucking hole 824. At the same time, the recording head 931 discharges ink particles to the recording medium while moving above the recording medium in a main scanning direction, thereby carrying out recording. Then, the discharge roller 853 is rotated to discharge, to an outside, the recording medium over which the recording is completely carried out.

Figure 27:
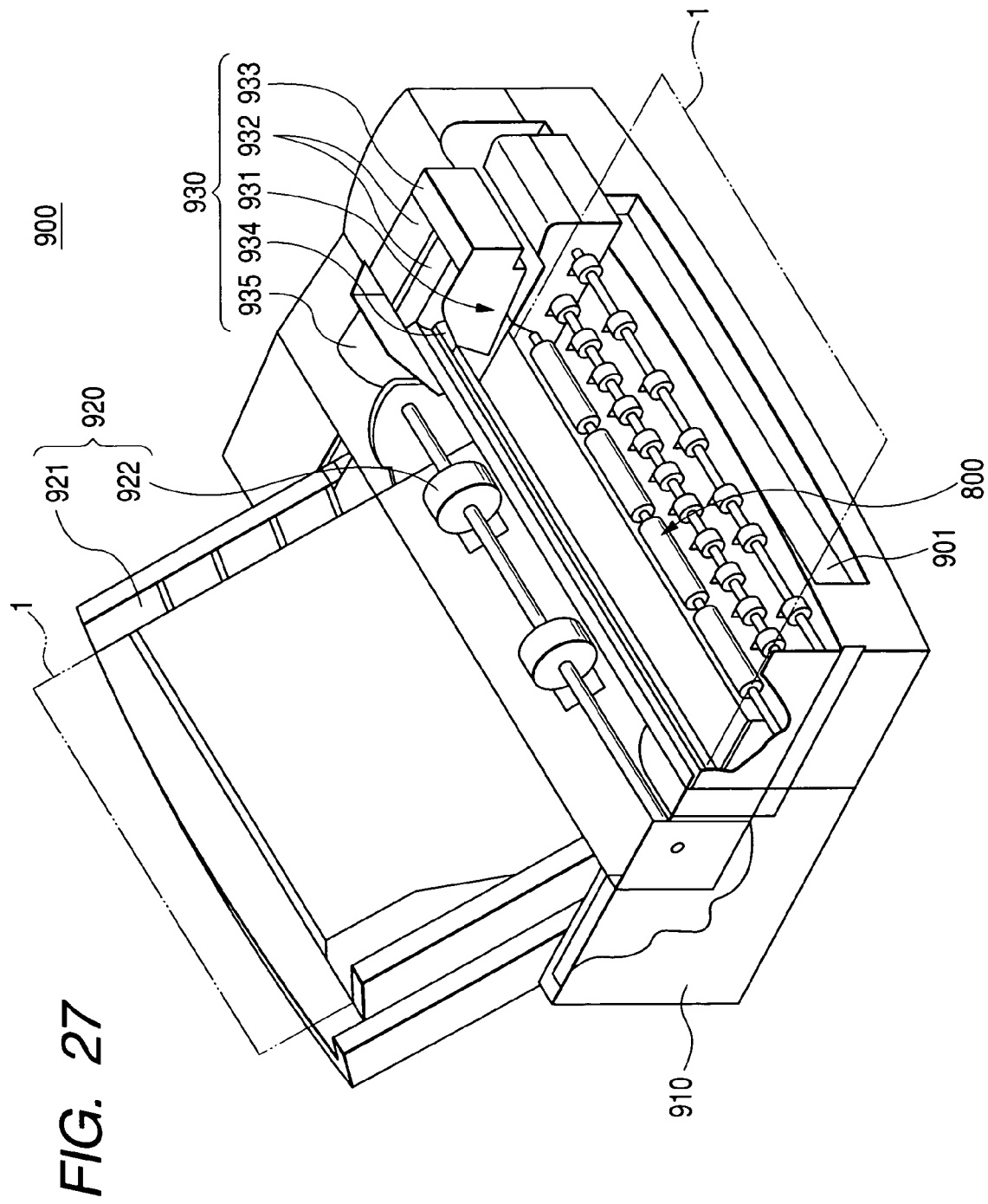
FIG. 27 is a perspective view showing an ink jet printer to be a liquid fixing apparatus comprising the recording medium transportation apparatus according to the invention.
Figure 28:
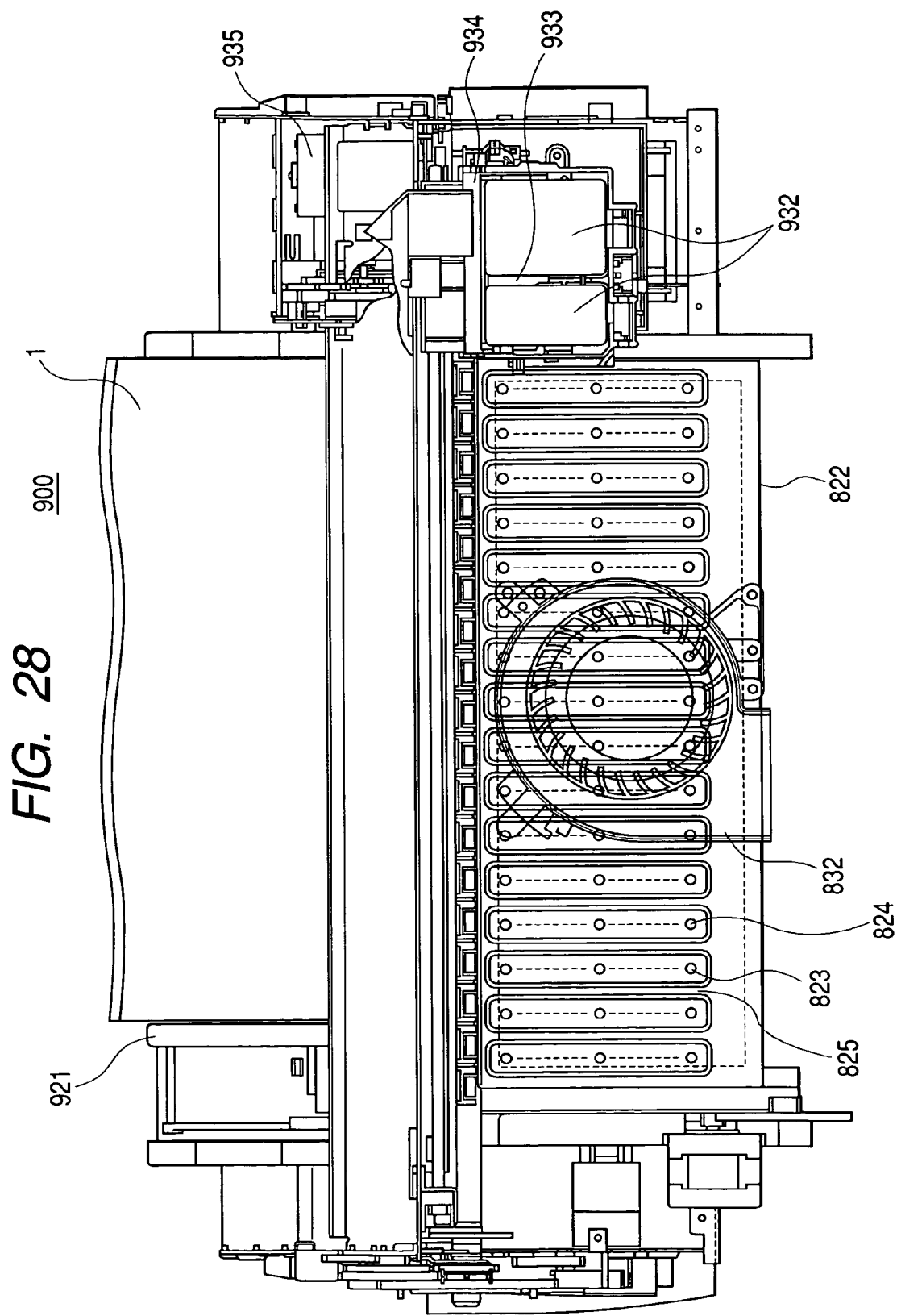
FIG. 28 is a plan view showing the main part of the ink jet printer in FIG. 27.
Figure 29:
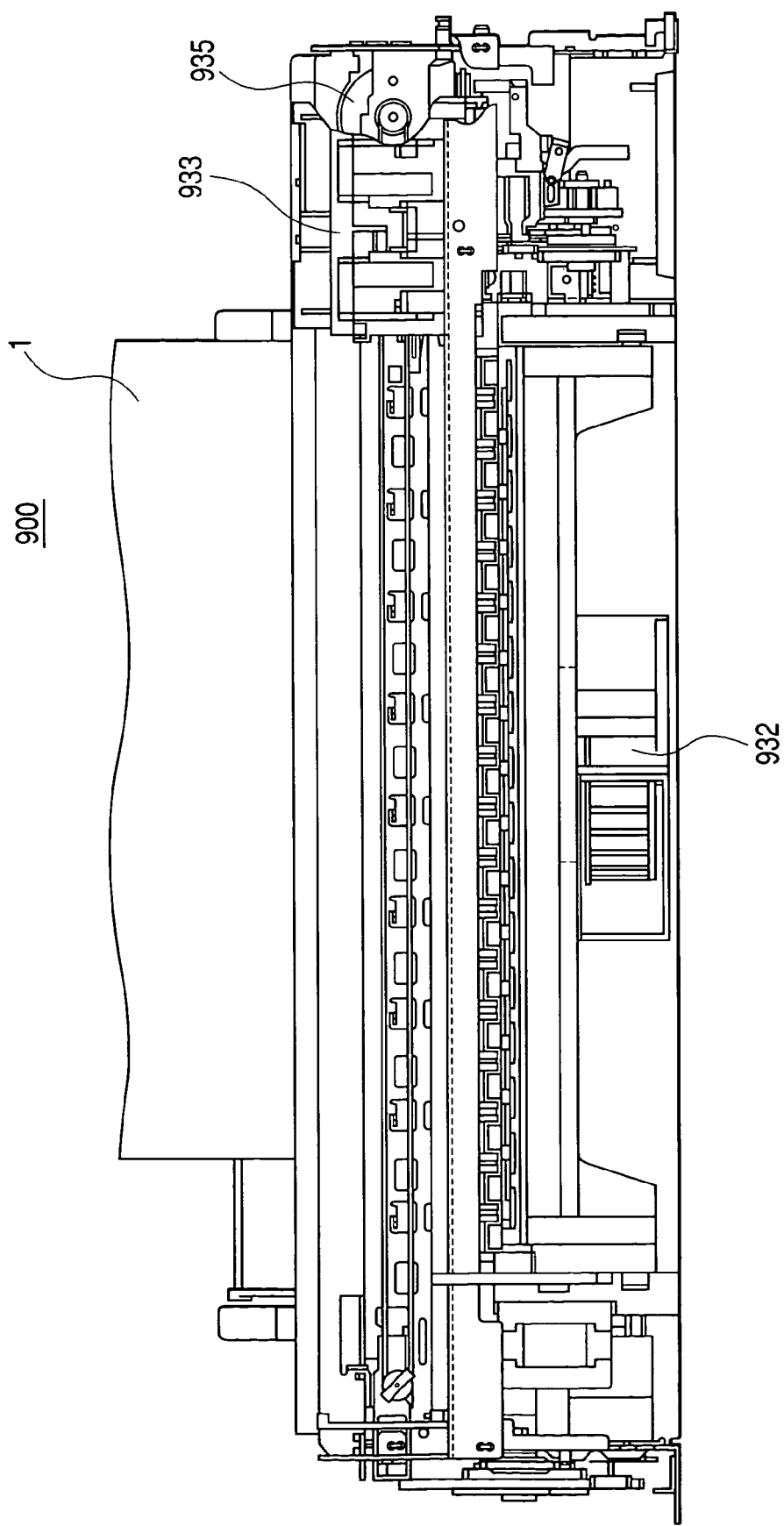
FIG. 29 is a front view showing the main part of the ink jet printer in FIG. 27.
Figure 30:
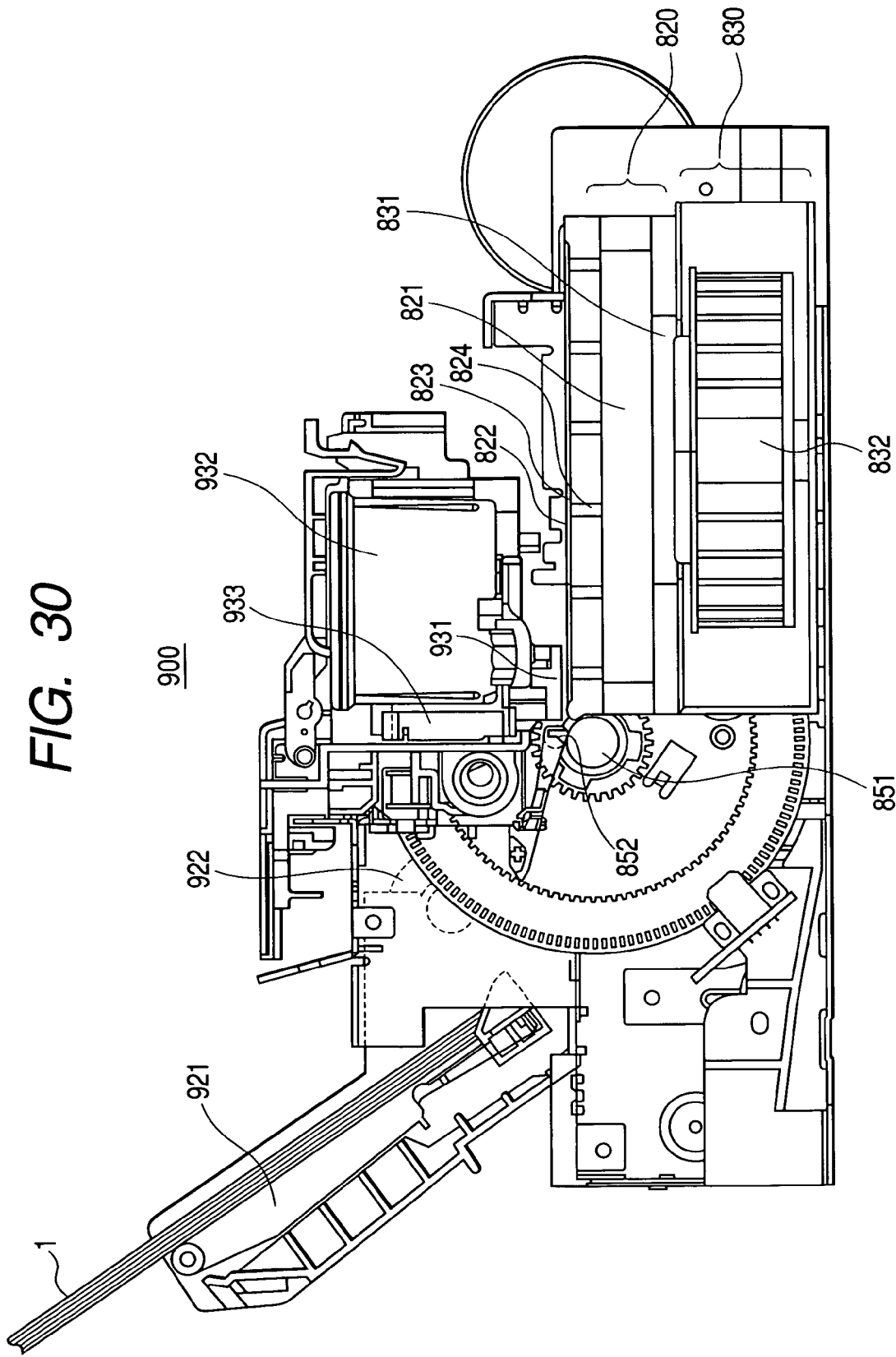
FIG. 30 is a side view showing the main part of the ink jet printer in FIG. 27.
Figure 31A:
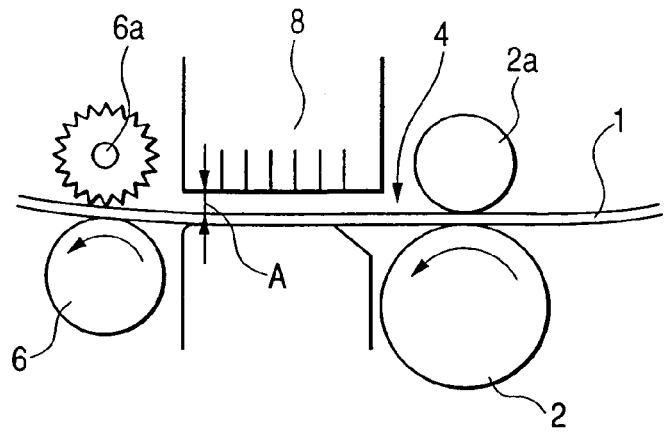
FIGS. 31A, 31B and 31C are views extracting only a recording section and the main part of a transportation apparatus of a recording medium in a conventional ink jet printer.
Figure 31B:
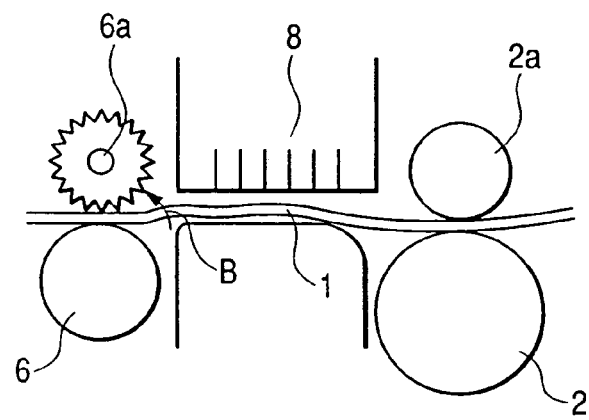
Figure 31C:
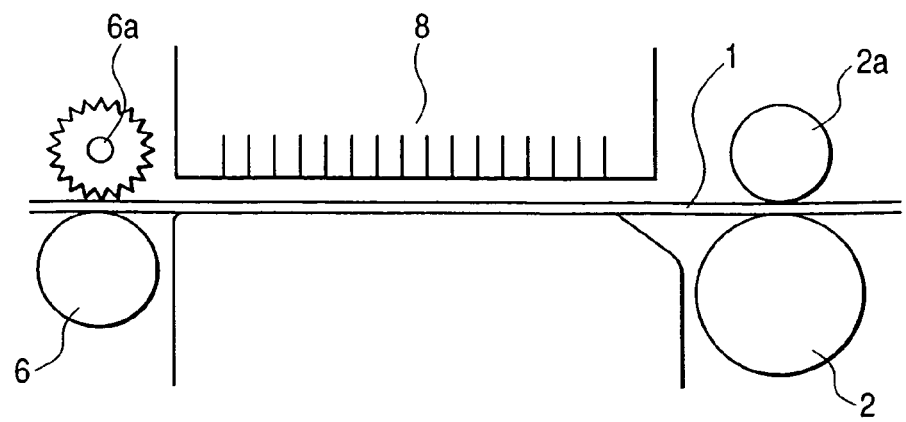
Figure 32:
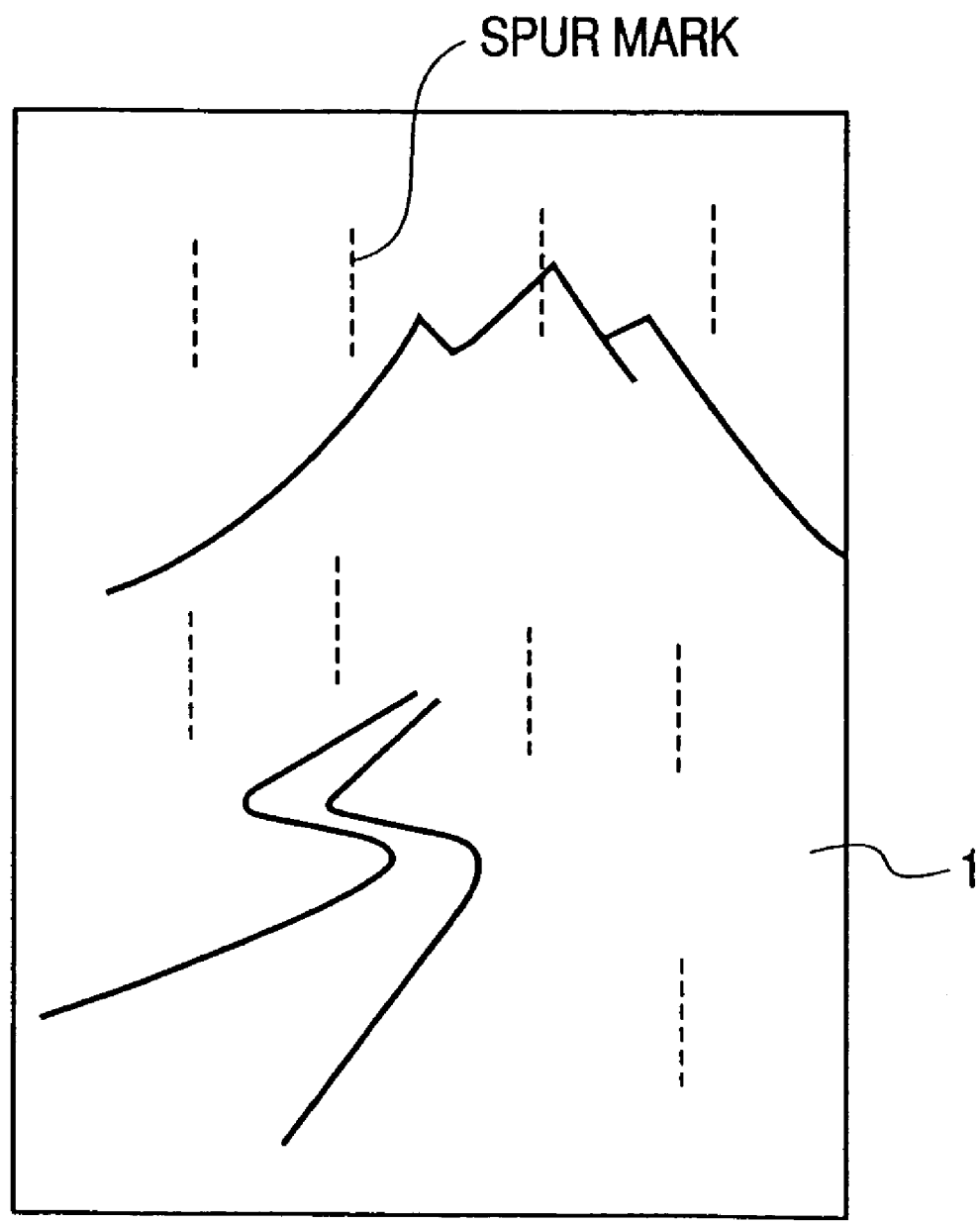
FIG. 32 is a view showing the spur nark of an image recorded in the conventional ink jet printer.

FIG. 27 is a perspective view showing an ink jet printer as a recording apparatus providing the recording medium transportation apparatus 800 of an eighth embodiment of the invention. FIG. 28 to FIG. 30 are a plan view, a front view, and a side view showing the main portions thereof. The ink jet printer 900 provides an automatic sheet feed (ASF) unit 920 attached obliquely at the rear side upper portion of a printer main body 910, a recording portion 930 built in the printer main body 910, and a recording medium transportation apparatus 800. For the recording medium, various kinds such as exclusive sheet of the ink jet printer 900, normal sheet, OHP film, tracing paper, post card, and so on can be used.

The ASF unit provides a tray 921 storing the sheets 1, a feed roller 922 drawing out the recording medium 1 from the tray 921 and feeding. A recording portion 930 provides a carriage installing a recording head 931 and an ink cartridge, a DC motor 935 moving the carriage 933 along a guide shaft 934 arranged to main scanning direction, and the like. The recording head 931 has a nozzle line consisting of plural nozzles, for example 96 pieces at each color of cyan, magenta, yellow, light cyan, light magenta, light yellow, and black for example.

The recording medium transportation apparatus 800 comprises the sucking unit 810 constituted by the sucking section 820 in an upper stage and the sucking force generating portion 830 in a lower stage which suck and hold a recording medium during recording, and the recording medium delivering device 850 for delivering the recording medium from the upstream side to the downstream side in the sucking unit 810. The sucking section 820 has the decompression chamber 821 formed in the inner part, the sucking chambers 823 formed, on the recording medium transportation surface 822, to be the concave portions which take a long rectangular shape in the transportation direction of the recording medium, and the sucking holes 824 for causing the sucking chambers 823 to communicate with the decompression chamber 821 respectively. The sucking hole 824 has the air inlet portion 824a provided with the chamfer 826a of the rounded surface R, and the air outlet portion 824b provided with the chamfer 826b of the taper surface.

An ink jet printer 900 having such a structure is operated in the following manner. When a recording instruction for a recording medium 1 accommodated in a tray 921 is input by a host computer which is not shown, a paper feeding roller 922 is rotated to pick up and feed the recording mediums 1 accommodated in the tray 921 one by one. Furthermore, the feeding roller 851 is rotated to feed the recording medium 1 into the portion between the recording head 931 and the sucking unit 810.

On the other hand, the pump 832 is driven to cause a sucking force to act on the sucking hole 824 and the sucking chamber 823 through the communicating hole 831 and the decompression chamber 821. Then, the recording medium 1 is delivered in such a state as to be sucked into the recording medium transportation surface 822. At this time, the sucking sound can be so suppressed as to be almost disregarded by the user because the separation of the vortex of the air flow which is generated over the edge of the sucking hole 824 is reduced by the chamfers 826a and 826b formed on the sucking hole 824. At the same time, a DC motor 935 is driven to move a carriage 933 along a guide shaft 934 through a timing belt.

At this time, the recording head 931 records by discharging ink discharged on the recording medium 1 from the ink cartridge 932 every color corresponding to recording data as small ink drops from whole or one of the plural nozzles. Thus, although cockling possibly generates at the recording medium 1 after recording, by transporting the recording medium 1 along the recording medium transportation surface 822, the cockling is drawn so that growth thereof is prevented. Driving to rotate the discharging roller 853 and the like (see FIG. 23), the sheet having finished recording is discharged outside from the discharging port 901.

As described above, the chamfers 826a and 826b are formed in at least one of the air inlet portion 824a and the air outlet portion 824b in the sucking hole 824 formed on the recording medium transportation surface 822 of the sucking section 820. Therefore, it is possible to almost prevent the separation of the vortex of the air flow which is generated in the air inlet portion 824a or the air outlet portion 824b in the sucking hole 824, and to reduce the generation of a sucking sound due to a periodic fluctuation in the separating vortex.

What is claimed is:

1. A medium transportation apparatus comprising:
   a sucking unit including a medium transportation surface on which a plurality of sucking holes are formed, a decompression chamber communicating with the sucking holes and a sucking device for sucking air in the decompression chamber;
   a delivering device for supplying a medium onto the medium transportation surface of the sucking unit;
   wherein, the medium supplied onto the medium transportation surface is sucked through the sucking hole by the sucking device, and delivered from an upstream side of the sucking unit to a downstream side thereof,
   wherein each of the sucking holes of the sucking unit is formed by a through hole section communicating with the decompression chamber and a sucking chamber having a larger area of a sucking surface opposed to the medium than a sectional area of the through hole section, and
   wherein side edges of said sucking chamber surrounding an entire periphery thereof are provided with flared slant faces.

2. The medium transportation apparatus according to claim 1, wherein each of the sucking chambers includes a concave portion formed onto the medium transportation surface and the sucking chambers are mutually partitioned by partition walls.

3. The medium transportation apparatus according to claim 2, wherein the concave portion is partitioned and formed by the partition walls in a main scanning direction and a subscanning direction of the transportation apparatus,
   wherein the subscanning direction is the transportation direction of the medium, and the main scanning direction is orthogonal to the transportation direction.

4. The medium transportation apparatus according to claim 2, wherein each of the sucking chambers has a sucking surface formed by an almost rectangular concave portion.

5. The medium transportation apparatus according to claim 4, wherein a width of a top of the partition walls is smaller than a dimension of one side or a diameter of the sucking surface of the sucking chamber.

6. The medium transportation apparatus according to claim 4, wherein a top of the partition walls is formed linearly with an area of approximately zero.

7. The medium transportation apparatus according to claim 4, wherein a top of the partition walls in at least a main scanning direction is formed linearly with an area of approximately zero,
   wherein the main scanning direction is a direction orthogonal to a transportation direction of the medium.

8. A liquid fixing apparatus comprising the medium transportation apparatus according to claim 1.

9. A medium transportation apparatus according to claim 1,
   wherein a hard porous material is provided in a position corresponding to a medium edge section of the medium transportation surface.

10. The medium transportation apparatus according to claim 9, wherein a hard porous material is provided in positions corresponding to widths of various papers of the medium.

11. The medium transportation apparatus according to claim 9, wherein the hard porous material is provided to be extended in a lateral direction of the medium.

12. The medium transportation apparatus according to claim 9, wherein the hard porous material is removably attached to the medium transportation surface.

13. The medium transportation apparatus according to claim 9, wherein an absorbing material is provided on an underside of the hard porous material.

14. The medium transportation apparatus according to claim 9, wherein a lower part of the hard porous material communicates with a decompression chamber.

15. A liquid fixing apparatus comprising the medium transportation apparatus according to claim 9.

16. A sucking unit comprising:
    a sucking and holding section provided with a plurality of sucking holes;
    a decompression chamber formed integrally with the sucking and holding section and communicating with the sucking holes, and
    a sucking device for sucking air in the decompression chamber,
    wherein a medium supplied onto the sucking and holding section is sucked onto the sucking and holding section by the sucking device through the sucking holes,
    wherein each of the sucking holes is formed by a through hole section communicating with the decompression chamber and a sucking chamber in which an area of a sucking surface opposed to the medium is larger than a sectional area of the through hole section, and
    wherein side edges of said sucking chamber surrounding an entire periphery thereof are provided with flared slant faces.

17. A medium transportation apparatus for sucking and delivering a medium supplied onto the medium transportation surface,
wherein the medium transportation surface is provided with a plurality of sucking chambers, each of which has a bottom surface and a pair of slant faces located on opposite sides of said bottom surface, said sucking chambers being configured such that a space (h) between the adjacent sucking chambers, a distance (i) of one of said slant faces, a distance (j) of said bottom surface and a distance (k) of the other of said slant faces are equal to one another so as to be capable of absorbing an improper state by a wrinkle generated in the medium.

18. The medium transportation apparatus according to claim 17, wherein the plurality of sucking chambers are formed corresponding to an extension rate of the medium.

19. The medium transportation apparatus according to claim 17, wherein the plurality of sucking chambers are formed corresponding to a shape of a wrinkle generated on the medium.

20. The medium transportation apparatus according to claim 17, wherein a regulating device for regulating a shape of a wrinkle generated on the medium is provided on an upstream side of transportation from the medium transportation surface.

21. The medium transportation apparatus according to claim 17, further comprising: a sucking unit including
a plurality of sucking holes provided on the medium transportation surface,
a decompression chamber communicating with the sucking holes, the sucking holes communicating with the decompression chamber and
a sucking device for sucking air in the decompression chamber,
wherein each of the sucking holes corresponds to each of the plurality of sucking chambers, the plurality of sucking chambers having a larger area of a sucking surface opposed to the medium than a sectional area of the sucking hole.

22. A liquid fixing apparatus comprising the medium transportation apparatus according to claim 17.

23. A medium transportation apparatus comprising:
a medium transportation surface on which a medium is sucked and transported;
a plurality of sucking chambers aligned to a transportation direction of the medium on said transportation surface, wherein a sucking hole is formed in substantially a center of each of said sucking chambers;
wherein side edges of said sucking chamber surrounding an entire periphery thereof are provided with flared slant faces.

24. A medium transportation apparatus comprising:
a medium transportation surface on which a medium is sucked and transported;
a sucking chamber formed on the medium transportation surface extending in a transportation direction of the medium substantially from an upstream end to a downstream end of the medium transportation surface; and
a plurality of sucking holes formed in the sucking chamber,
wherein side edges of said sucking chamber surrounding an entire periphery thereof are provided with flared slant faces.

* * * * *